(12) United States Patent
Tarsa et al.

(10) Patent No.: US 10,619,823 B2
(45) Date of Patent: Apr. 14, 2020

(54) OPTIC ASSEMBLIES AND APPLICATIONS THEREOF

(71) Applicant: Cree, Inc., Durham, NC (US)

(72) Inventors: Eric J. Tarsa, Goleta, CA (US); Kurt Wilcox, Libertyville, IL (US); Theodore Lowes, Lompoc, CA (US); Jean-Claude de Sugny, Santa Barbara, CA (US)

(73) Assignee: IDEAL INDUSTRIES LIGHTING LLC, Sycamore, IL (US)

( * ) Notice: Subject to any disclaimer, the term of this patent is extended or adjusted under 35 U.S.C. 154(b) by 210 days.

(21) Appl. No.: 15/483,199

(22) Filed: Apr. 10, 2017

(65) Prior Publication Data

US 2018/0292071 A1   Oct. 11, 2018

(51) Int. Cl.
| | | |
|---|---|---|
| *F21V 5/00* | (2018.01) | |
| *F21V 5/04* | (2006.01) | |
| *F21V 7/00* | (2006.01) | |
| *G02B 19/00* | (2006.01) | |
| *F21V 5/08* | (2006.01) | |
| *F21W 131/103* | (2006.01) | |
| *F21S 8/06* | (2006.01) | |
| *F21V 29/77* | (2015.01) | |
| *F21V 29/83* | (2015.01) | |
| *F21Y 115/10* | (2016.01) | |

(52) U.S. Cl.
CPC .............. *F21V 5/007* (2013.01); *F21V 5/045* (2013.01); *F21V 5/08* (2013.01); *F21V 7/0091* (2013.01); *G02B 19/0028* (2013.01); *G02B 19/0061* (2013.01); *G02B 19/0066* (2013.01); *F21S 8/06* (2013.01); *F21V 29/773* (2015.01); *F21V 29/83* (2015.01); *F21W 2131/103* (2013.01); *F21Y 2115/10* (2016.08)

(58) Field of Classification Search
CPC .......... F21V 13/04; F21V 5/007; F21V 5/045; F21V 7/0083; F21V 7/0091; F21V 7/048; G02B 19/0028; G02B 19/0061; G02B 19/0066
See application file for complete search history.

(56) References Cited

U.S. PATENT DOCUMENTS

| | | | | |
|---|---|---|---|---|
| 2008/0198604 | A1* | 8/2008 | Kim ........................ | F21V 5/008 362/293 |
| 2014/0321113 | A1* | 10/2014 | Onac ........................ | F21V 9/30 362/231 |
| 2015/0117021 | A1* | 4/2015 | Chinniah ................. | F21V 3/00 362/294 |
| 2016/0312979 | A1* | 10/2016 | Ebner ................ | G02B 19/0066 |
| 2017/0191637 | A1* | 7/2017 | Gommans ............... | F21V 5/002 |
| 2018/0252388 | A1* | 9/2018 | Gommans ............... | F21V 5/045 |

* cited by examiner

*Primary Examiner* — Mary Ellen Bowman
(74) *Attorney, Agent, or Firm* — J. Clinton Wimbish; Nexsen Pruet, PLLC

(57) ABSTRACT

In one aspect, optic assemblies are provided comprising a collimating optic directing light along a collimation axis and light redirection elements comprising facets for redirecting a portion of the light in one or more directions away from the collimation axis.

32 Claims, 27 Drawing Sheets

FIG. 27(a)
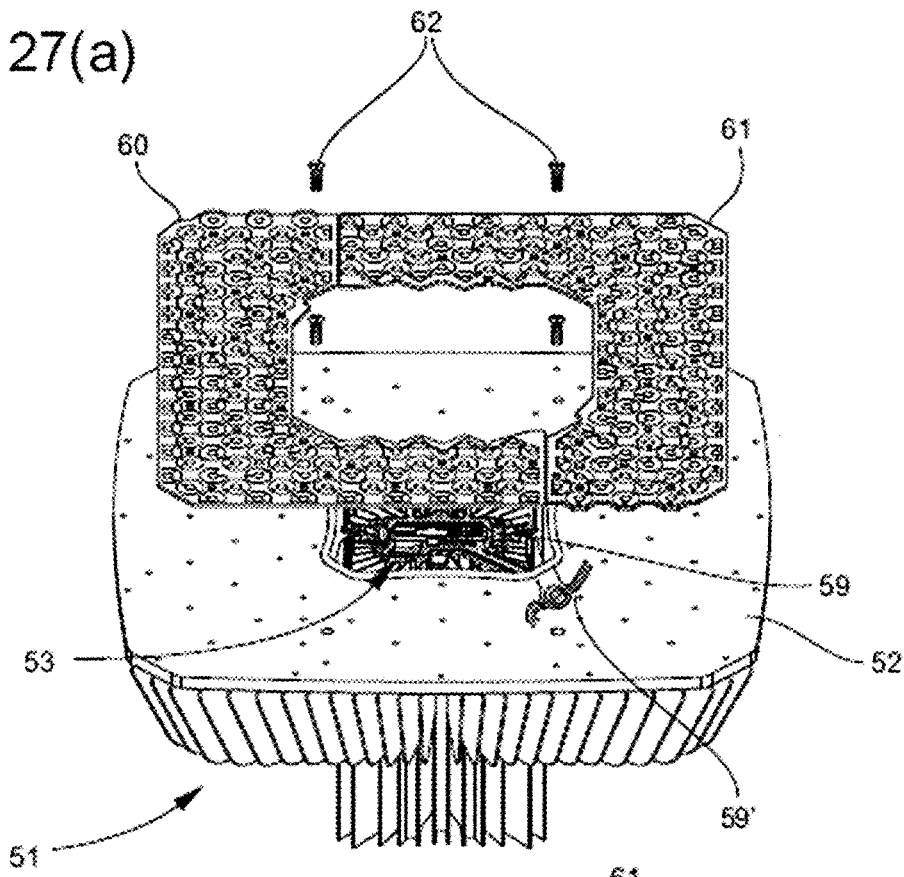
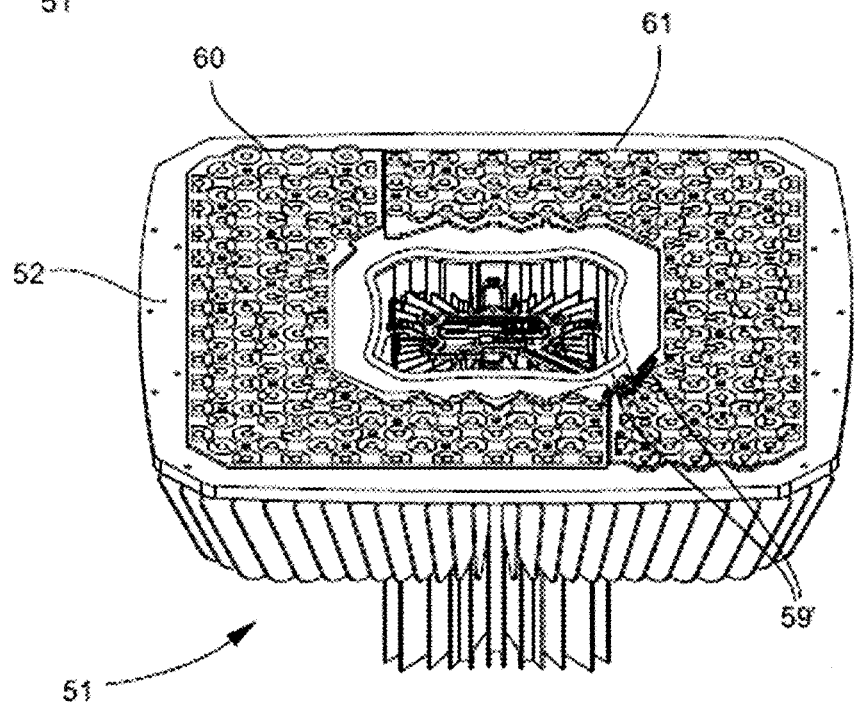
FIG. 27(b)

OPTIC ASSEMBLIES AND APPLICATIONS THEREOF

FIELD

The present invention relates to optic assemblies and, in particular, to optic assemblies employing a collimating optic and optical elements for redirecting a portion of collimated light in one or more directions away from the collimation axis.

BACKGROUND

Lighting fixtures, such as sidewalk, roadway and/or parking lot fixtures, often provide high angle lighting distributions for meeting various areal lighting requirements. Lighting fixtures, for example, can provide a Type II distribution suitable for walkways, highway on-ramps and off-ramps as well as other long and narrow corridors. In other embodiments, lighting fixtures can provide a Type III distribution generally employed for roadway lighting and parking lots where a larger area of lighting is required. Alternatively, a Type V lighting distribution can be provided. Type V lighting distribution can be circular or square, having isotropic intensity over all lateral angles.

Achieving high angle lighting distributions with acceptable uniformity and limited glare can be difficult. High angle lighting distributions often contain severe bright spots that only exacerbate visual discomfort resulting from fixture glare. Moreover, point sources of high intensity, such as light emitting diodes (LEDs), can provide multiple bright spots over the light emitting face of a fixture. Various optics have been employed to improve luminous uniformity and glare reduction. However, such optics struggle with effectively mixing and spreading light from intense point sources over high distribution angles.

SUMMARY

In view of these disadvantages, optic assemblies are provided which, in some embodiments, can provide high angle lighting distributions with enhanced uniformity and reduced glare. Briefly, an optic assembly described herein comprises a collimating optic directing light along a collimation axis and light redirection elements comprising facets for redirecting a portion of collimated light in one or more directions away from the collimation axis. In some embodiments, one or more of the facets intersect the collimation axis at an angle supporting redirection of the light by total internal reflection. Alternatively, facets may redirect collimated light via reflective and/or refractive surfaces.

In another aspect, luminaire architectures are described herein. In some embodiments, a luminaire comprises a light source and one or more optic assemblies receiving light from the light source, the optic assemblies comprising a collimating optic directing the light along a collimation axis. The optic assembly also comprises light redirection elements comprising facets for redirecting a portion of the collimated light in one or more directions away from the collimation axis. As described further herein, the optic assembly, in some embodiments, can assist in providing high angle or lateral lighting distributions from the luminaire.

These and other embodiments are further described in the detailed description which follows.

BRIEF DESCRIPTION OF THE DRAWINGS

FIGS. 27(a) and 27(b) illustrate LED panels comprising array of LED modules coupled to the base of a heatsink of a luminaire according to some embodiments.

DETAILED DESCRIPTION

Figure 1:
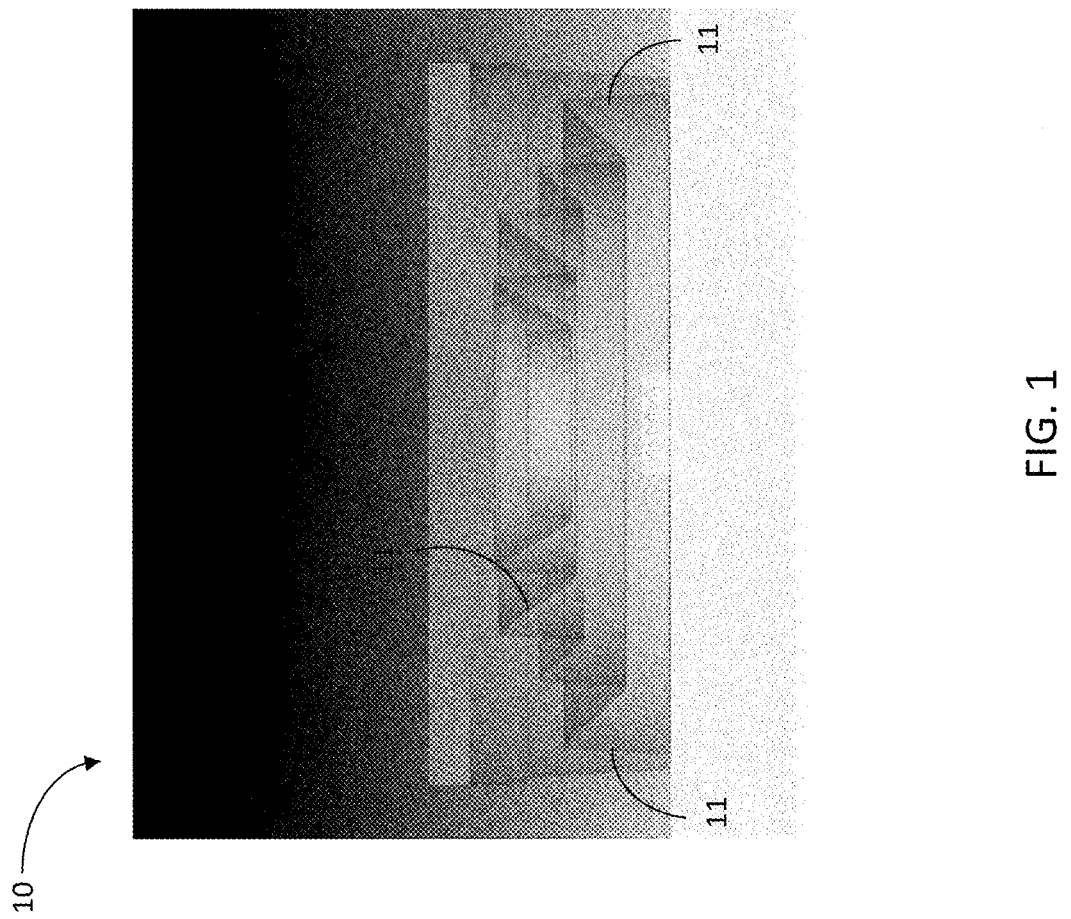
FIG. 1 illustrates a collimating optic of an assembly according to some embodiments.

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

I. Optic Assemblies

In one aspect, optic assemblies are provided comprising a collimating optic directing light along a collimation axis and light redirection elements comprising facets for redirecting a portion of the light in one or more directions away from the collimation axis. As described further herein, collimating light from a light source prior to redirection of the collimated light with redirection elements can enhance uniformity of various lighting distributions, thereby reducing glare and bright spots.

Turning now to specific components, the optic assembly comprises a collimating optic operable for collimating light received from the light source along a collimation axis. Any collimating optic not inconsistent with the objectives of the present invention can be employed. In some embodiments, a collimating optic comprises a plurality of refractive facets for collimating light along a collimation axis. Refractive facets of the collimation optic can have any desired angular arrangement relative to the collimation axis. In some embodiments, facets of the collimation optic have a Fresnel architecture and/or arrangement. Facets having concentric arrangement of Fresnel architecture can have any slope angle, draft angle and/or facet spacing. Facet spacing can be periodic or aperioidic. In some embodiments, facets have equal slope angle across the concentric annular sections. In other embodiments, slope angle varies across concentric annular sections. Facet slope angle, for example, can increase or decrease in a radial direction extending from the center of the optic to the optic perimeter. Facet slope angle of each concentric annular section can be selected to provide desired collimation performance. Facet slope angles can generally range from 10 degrees to 80 degrees, in some embodiments. Moreover, facet height can be constant between concentric annular sections of a collimating optic employing Fresnel architecture. In other embodiments, facet height can increase or decrease in a radial direction extending from the center of the optic to the optic perimeter.

Figure 2:
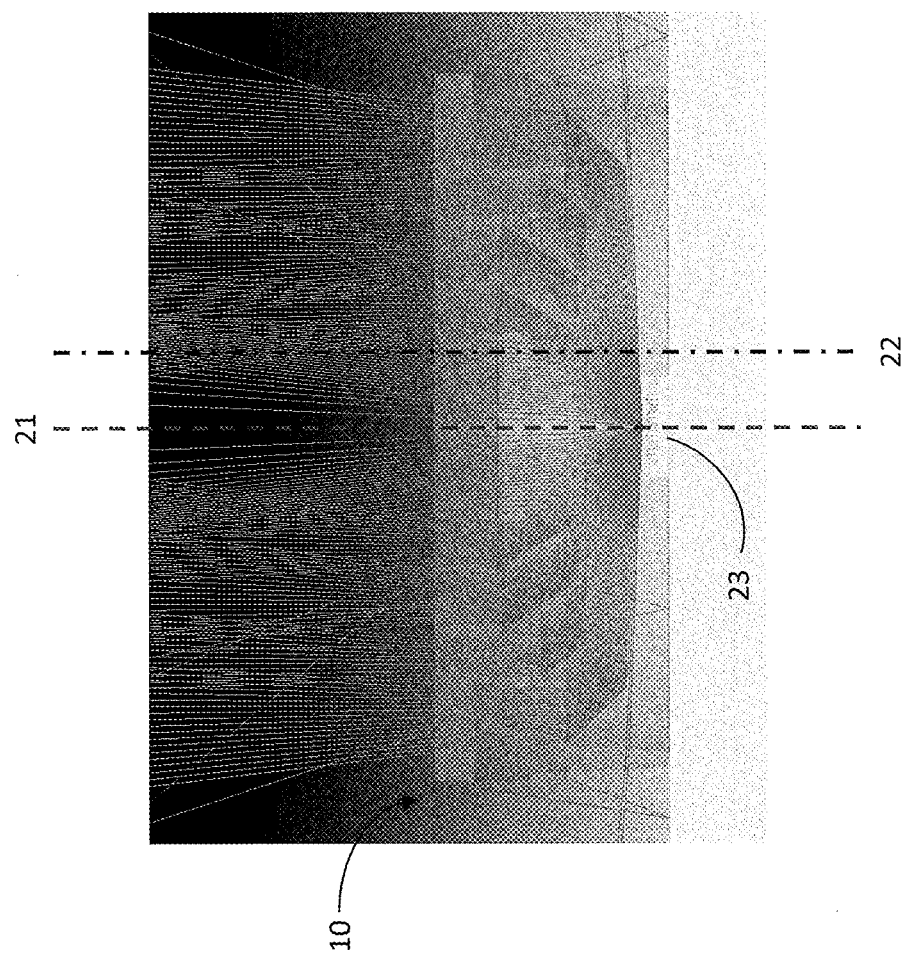
FIG. 2 is a ray diagram illustrating collimation by the optic of FIG. 1 according to some embodiments.
Figure 3:
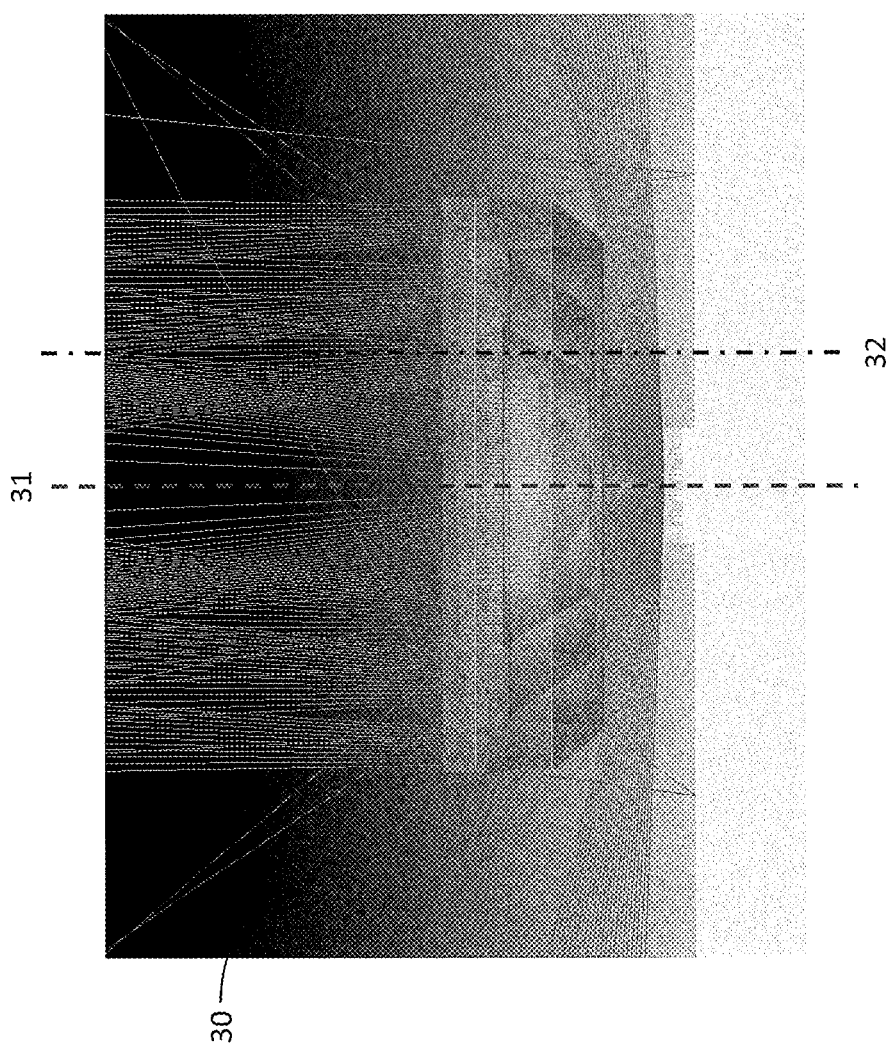
FIG. 3 is a ray diagram illustrating operation of a collimating optic according to some embodiments.
Figure 4:
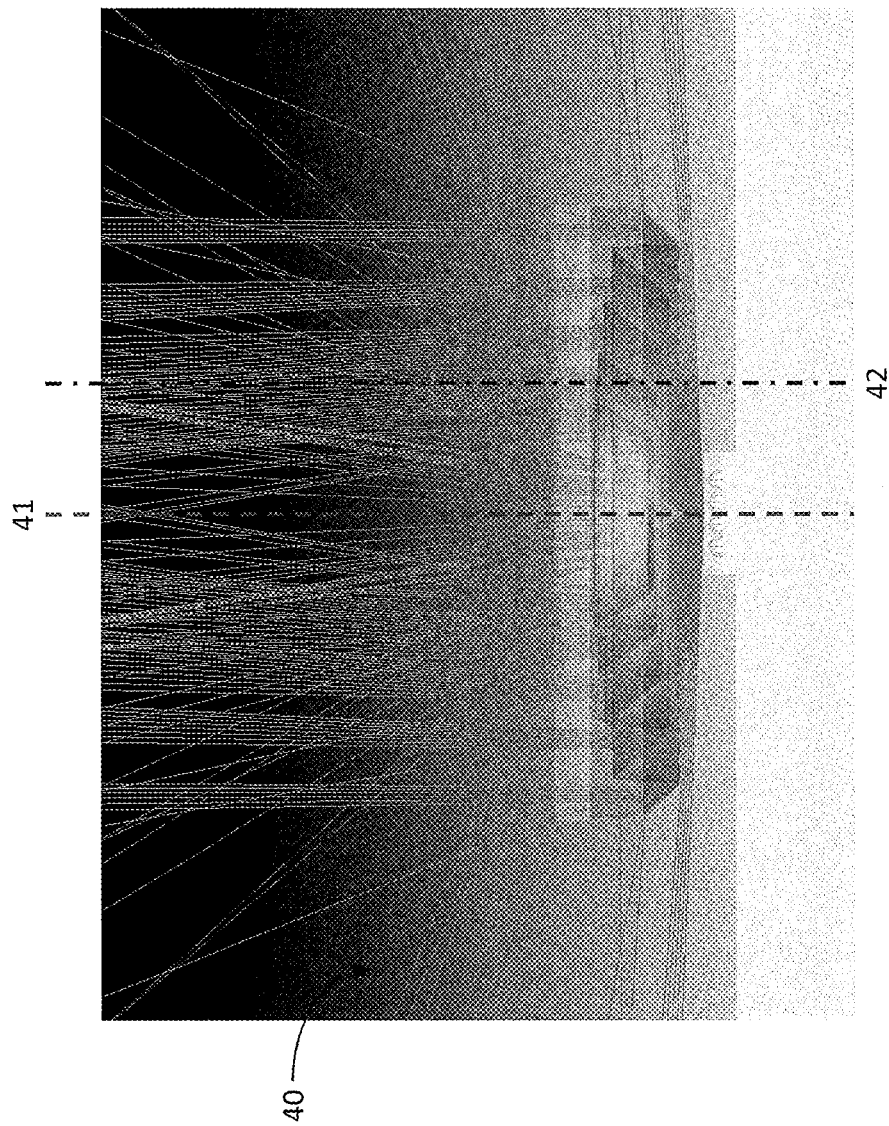
FIG. 4 is a ray diagram illustrating operation of a collimating optic according to some embodiments.

FIG. 1 illustrates one non-limiting embodiment of a collimating optic of an assembly described herein. As illustrated in FIG. 1, the collimating optic 10 comprises Fresnel architecture of facets 11 having a concentric annular arrangement. Slope angle and facet height varies between the concentric annular sections. FIG. 2 is a ray diagram illustrating collimation by the optic of FIG. 1. Light entering the optic 10 from the light source 23 is refracted and collimated along a collimation axis 21. In the embodiment of FIG. 2, the collimation axis 21 is parallel or substantially parallel to the vertical axis 22 of the optic 10. FIGS. 3 and 4 also illustrate light collimation by optics 30, 40 comprising facets having a concentric annular arrangement. Similar to FIG. 2, collimation axes 31, 41 of FIGS. 3 and 4 are parallel to the vertical axes 32, 42. In some embodiments, the collimated beam of light is symmetrical or substantially symmetrical about the vertical axis of the collimating element. Alternatively, the beam of collimated light may be asymmetrical about the vertical axis. Collimating optics employing Fresnel architecture can be formed of any light transmissive material of suitable refractive index. In some embodiments, the collimating optic is formed of glass or radiation transmissive polymeric material. Suitable radiation transmissive polymeric materials include acrylics or polycarbonates.

Figure 5:
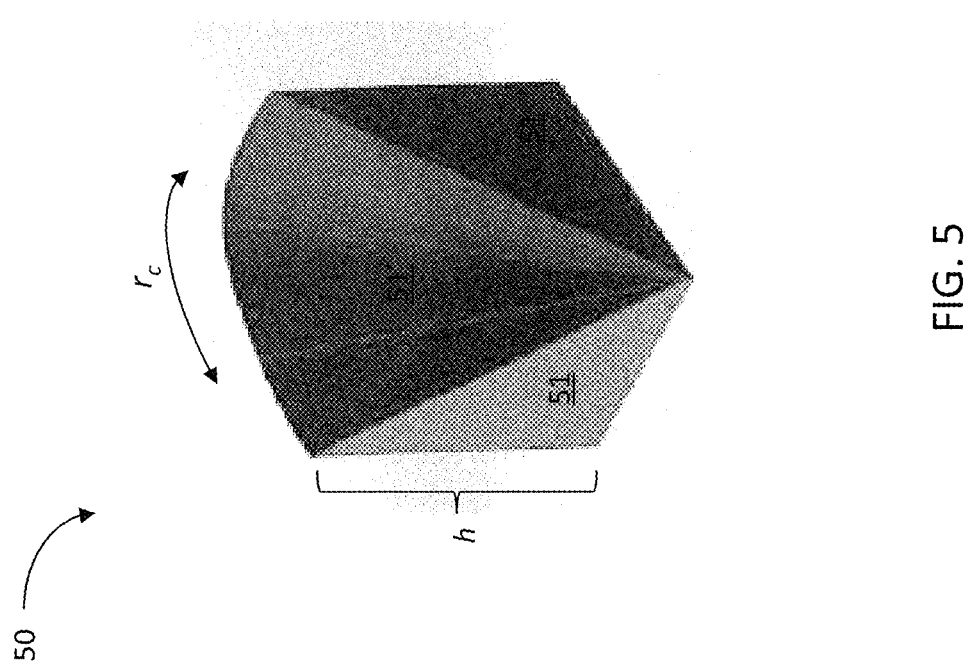
FIG. 5 is a perspective view of a light redirection element according to some embodiments.
Figure 6:
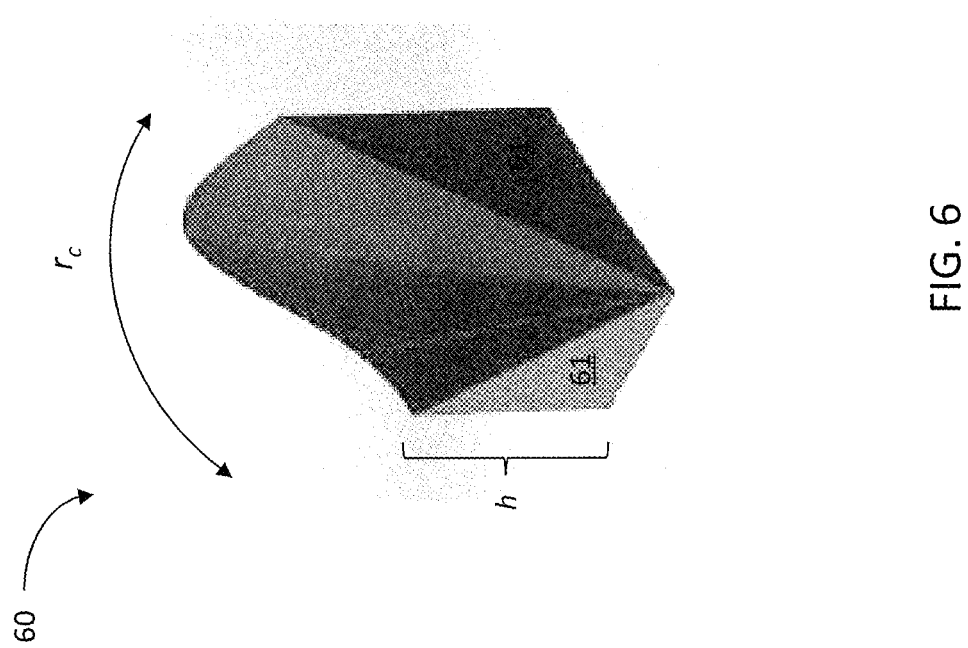
FIG. 6 is a perspective view of a light redirection element according to some embodiments.
Figure 7:
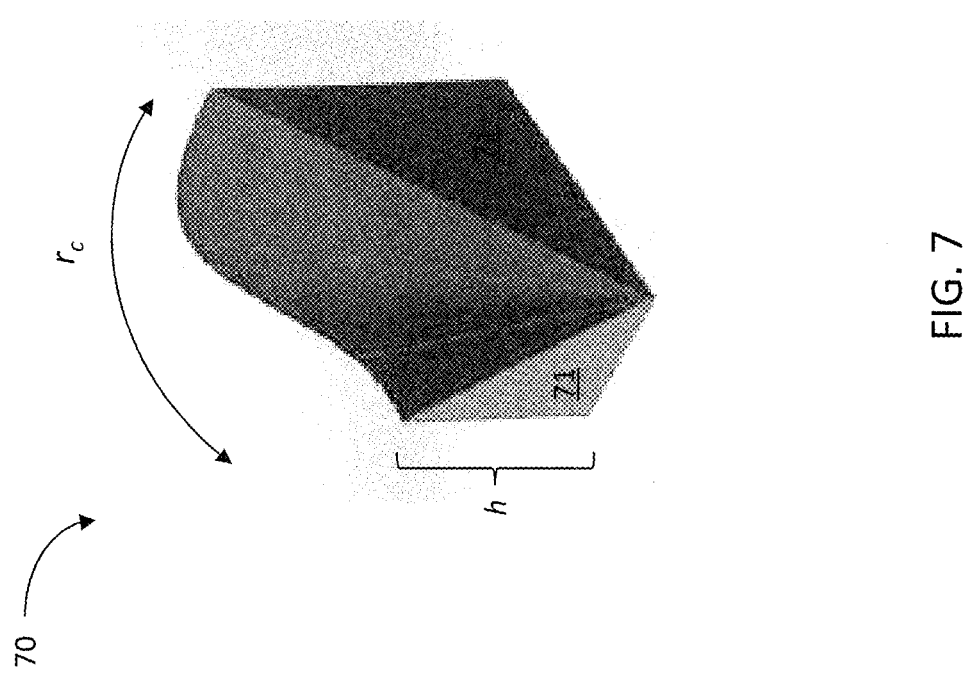
FIG. 7 is a perspective view of a light redirection element according to some embodiments.
Figure 8A:
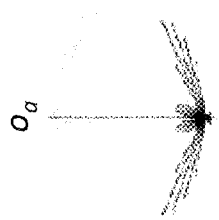
FIG. 8(a) illustrates light distribution provided by the redirection element of FIG. 5.
Figure 8B:
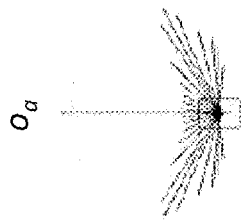
FIG. 8(b) illustrates light distribution provided by the redirection element of FIG. 6.
Figure 8C:
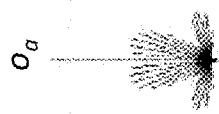
FIG. 8(c) illustrates light distribution provided by the redirection element of FIG. 7.

As described herein, the optic assembly further comprises light redirection elements comprising facets for redirecting at least a portion of the light exiting the collimation optic in one or more directions away from the collimation axis. Facets of the light redirection elements can have any geometry and design for providing desired lighting distributions via redirection of the collimated light away from the collimation axis. In some embodiments, for example, facets redirect light from the collimation axis at one or more angles greater than 50 degrees. In some embodiments, the light redirection elements are arranged in an array. When in array format, the facets can have uniform spacing or non-uniform spacing. Moreover, one or more of the facets intersect the collimation axis at an angle supporting redirection of the light by total internal reflection. For intersection angles not supporting total internal reflection, facets can comprise reflective surface coatings and/or redirect light away from the collimation axis by refraction. In some embodiments, an array comprises any combination of redirection elements comprising facets redirecting light by total internal reflection, specular or diffuse reflection and/or refraction. Light redirection mechanism of an individual redirection element may be selected according to several considerations including, but not limited to, position of the element in the array, facet angle of the element relative to the collimation axis, design of neighboring redirection elements and desired lighting distribution provided by the optic. In some embodiments, for example, an array can comprise elements redirecting light from the collimation axis by total internal reflection at angles of 50-65 degrees. For redirection of light at angles exceeding 65 degrees, the array can comprise light redirection elements comprising facets with reflective coatings and/or refractive surfaces FIG. 5 illustrates a perspective view of a light redirection element according to some embodiments. The light redirection element 50 comprises a facet 51 having radial curvature ($r_c$). In the embodiment of FIG. 5, radial curvature ($r_c$) of the facet 51 extends 90 degrees. The facet 51 also has constant height (h) over the radial curvature ($r_c$). As illustrated in FIG. 5, radial curvature ($r_c$) in conjunction with height (h) fauns a curved interior surface 51' of the facet 51. FIG. 6 illustrates a perspective view of a light redirection element according to another embodiment. The light redirection element 60 also comprises a facet 61 having radial curvature ($r_c$) extending 90 degrees. However, unlike the redirection element of FIG. 5, height (h) of the redirection element of FIG. 6 varies over the radial curvature ($r_c$). In some embodiments, height of the radial curvature ($r_c$) is set according to several polynomial functions forming segments of the facet 61. FIG. 7 also illustrates a light redirection element 70 comprising a facet 71 wherein facet height (h) varies over radial curvature ($r_c$). Facet height can be varied to alter lighting distributions produced by the redirection elements. FIG. 8(a) illustrates the lighting distribution provided by the light redirection element 50 of FIG. 5. As illustrated in FIG. 8(a), the light redirection element 50 provides a narrow light distribution surrounding the optical axis ($o_a$) of the element. This is in contrast to the lighting distribution provided by the redirection element 60 of FIG. 6. As illustrated in FIG. 8(b), the light redirection element 60 provides an output wherein the light is redistributed at high angles relative to the optical axis ($o_a$) of the element. Light output of the redirection element 70 of FIG. 7 also redistributes the light at high angles relative to the optical axis ($o_a$) of the element, as illustrated in FIG. 8(c).

Specific output of a light redirection elements can be varied according to facet radial curvature and facet height. A light redirection element can have any desired radial curvature, such as curvature extending a full 360 degrees or any subset of 360 degrees. In some embodiments, a light redirection element has radial curvature less than 90 degrees or greater than 90 degrees. Radial curvature of a light redirection element, in some embodiment, has a value of radial curvature selected from Table I.

TABLE I

| Light Redirection Element Radial Curvature ($r_c$)-degrees |
| --- |
| 90-270 |
| 45-270 |
| 45-180 |
| 90-180 |
| 180-360 |
| 30-90 |

A light redirection element can also comprise any height in combination with radial curvature to produce the desired light output. Height can be constant over the entire radial curvature or can vary over the radial curvature. In some embodiments, facet height can have a single peak or multiple peaks and valleys. In some embodiments, facet height over the radial curvature can vary according to multiple polynomial segments, such as in a spline curve. A spline curve defining facet height over the radial curvature can be set by any desired number of control points. Depending on specific facet height parameters, suitable polynomials defining the spline curve can be quadratic and/or cubic. Under these design parameters, a light redirection element can be design with any height variation over the radial curvature.

Figure 8D:
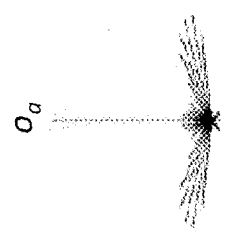
FIG. 8(d) illustrates light distribution of the array illustrated in FIG. 9.
Figure 9:
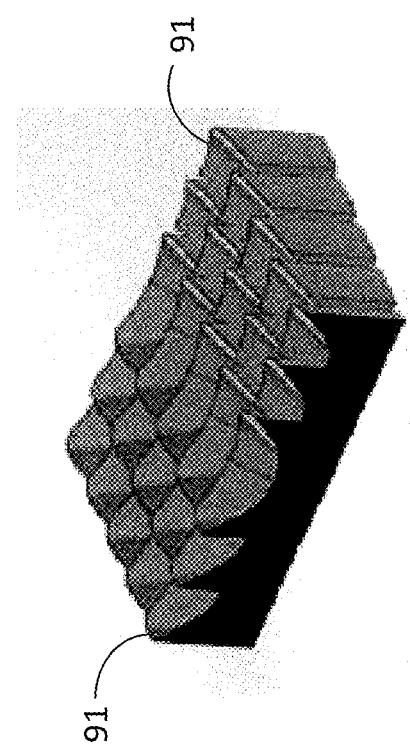
FIG. 9 illustrates an array of light redirection elements according to some embodiments.

As described herein, the light redirection elements can be arranged in array format. FIG. 9 illustrates an array of light redirection elements according to some embodiments. Light redirection elements of the two-dimensional array can be selected independently of one another to provide the desired lighting distribution from redirecting the collimated light. Alternatively, the light redirection elements are selected with reference to one another to provide the desired lighting distribution. For example, light redirection elements can be selected from the designs illustrated in FIGS. 5-7. As shown in FIGS. 8(a)-(c), the redirection elements provide differing light outputs. Two or more redirection elements of differing structure can be arranged in an array in one or several ways to tailor output of the redirected collimated light. FIG. 8(d) illustrates light redirection output of the array detailed in FIG. 9. It can be seen that light output of the array is a summation of the individual outputs of redirection elements 91 selected from FIGS. 5-7.

Specific arrangement of light redirection elements in an array be selected according to several considerations including, but not limited to, light output of the redirection elements, design and structure of the redirection elements, properties of the collimated light received by the redirection elements and structure and/or properties of the collimating optic upstream of the array in the optical path. In some embodiments, for example, light redirection elements are arranged to provide periodic or uniform spacing between facets of the elements. In other embodiments, light redirection elements are arranged to provide aperiodic or varying spacing between facets of the elements. Additionally, light redirection elements can be arranged to align facets of the elements with facets of the collimating optic. In other embodiments, light redirection elements can be arranged to offset facets of the elements from facets of the collimating optic.

Figure 10:
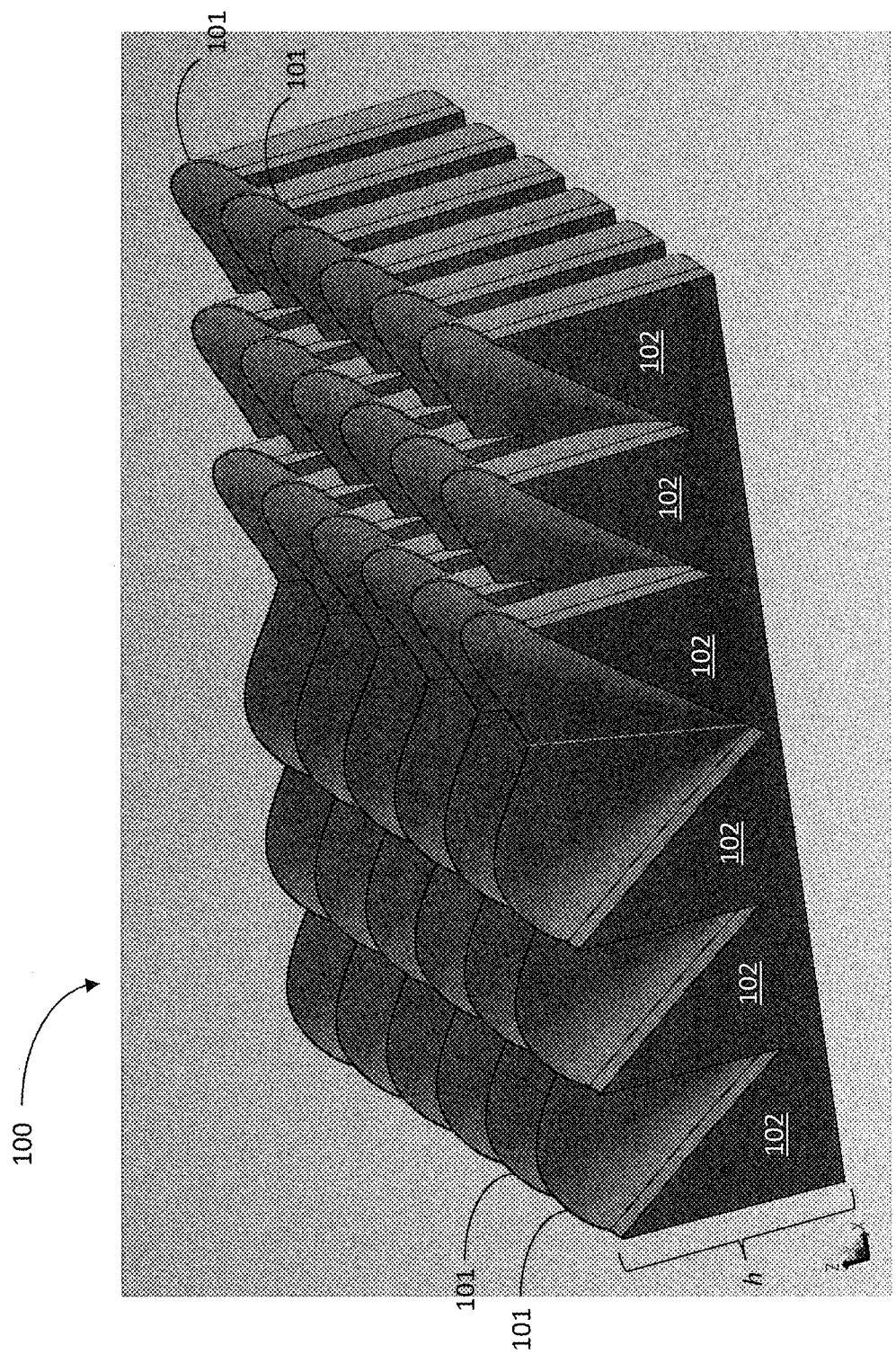
FIG. 10 illustrates an array of light redirection elements according to some embodiments.

FIG. 10 illustrates an array of light redirection elements according to some embodiments. As illustrated in FIG. 10, the light redirection elements 101 of the optic are arranged to provide uniform or substantially uniform facet 102 spacing. Facet height (h) decreases from the array center to the array periphery. While decreasing in height (h) over the array 100, the individual facets 102 exhibit the same or similar variances in height (h) over the facet radial curvature ($r_c$). In some embodiments, a single spline curve can repeated across the radial curvature of the facets 102. In other embodiments, spline curves vary across facets 102 of the array 100.

As described herein, light redirection elements can receive collimated light directly from the collimating optic. In some embodiments, light redirection elements can reside on a downstream surface of the collimating optic. The collimating optic may comprises a planar or curved downstream surface on which light redirection elements reside. For example, light redirection elements described herein can be reside on the planar side of a Fresnel collimating optic, in some embodiments. Light redirection elements can be formed of the same material as the collimating optic to inhibit or preclude disruption of the collimated beam by different indices or refraction between the light redirection elements and collimating optic. In some embodiments, for example, the collimating optic and light redirection elements are formed as a single monolithic construction. When provided as a single monolithic construction, the collimating optic and light redirection elements can have thickness less than 4 mm. In some embodiments, thickness of the collimating optic and light redirection elements is 1 mm to 3 mm Low thickness of the collimating optic and light redirection elements can facilitate placement over LED modules of luminaires.

In other embodiments, light redirection elements and the collimating optic may have differing indices of refraction. Differing indices of refraction can be employed to refract the collimated light at higher angles prior to redirection by the redirection elements. In this way, higher angles of light distribution may be achieved. In some embodiments, for example, the collimating optic and light redirection elements are formed independently and subsequently coupled by adhesive or other means. In other embodiments, light redirection elements do not reside on one or more surfaces of the collimating optic. Light redirection elements, for example, can part of an independent optic downstream of the collimating optic. When provided as a separate optic, indices of refraction can be further manipulated to achieve high angle or lateral lighting distributions as the collimated light will pass through a medium, such as air, prior to reaching the redirection elements.

Figure 11:
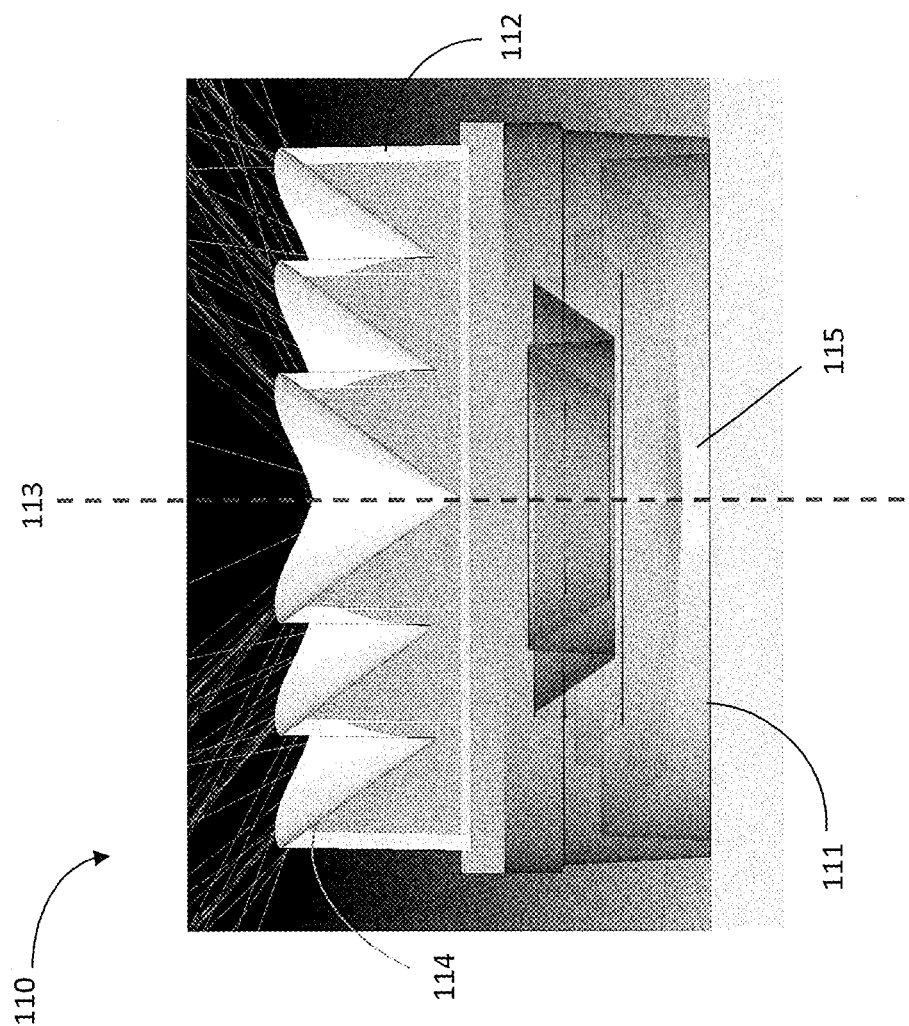
FIG. 11 is a ray diagram of an optic assembly according to some embodiments.
Figure 12:
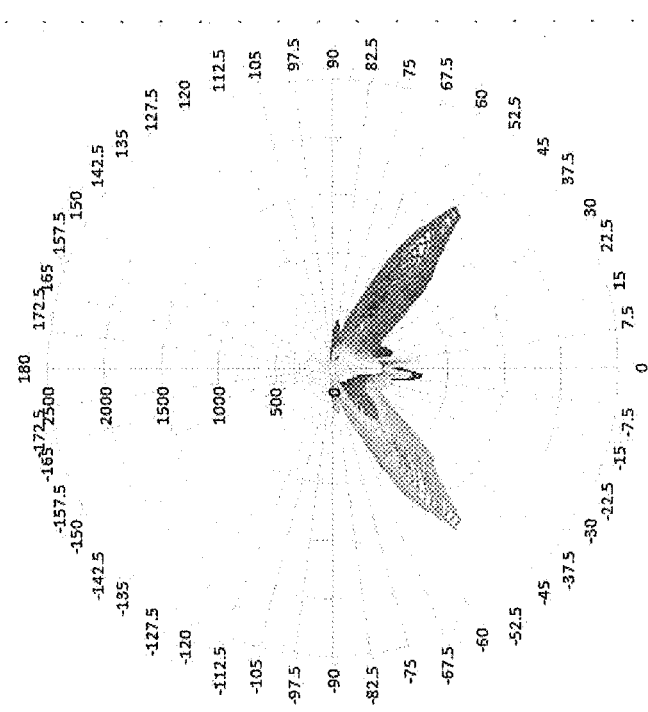
FIG. 12 illustrates the lighting distribution provided the optic assembly of FIGS. 11 and 13.
Figure 13:
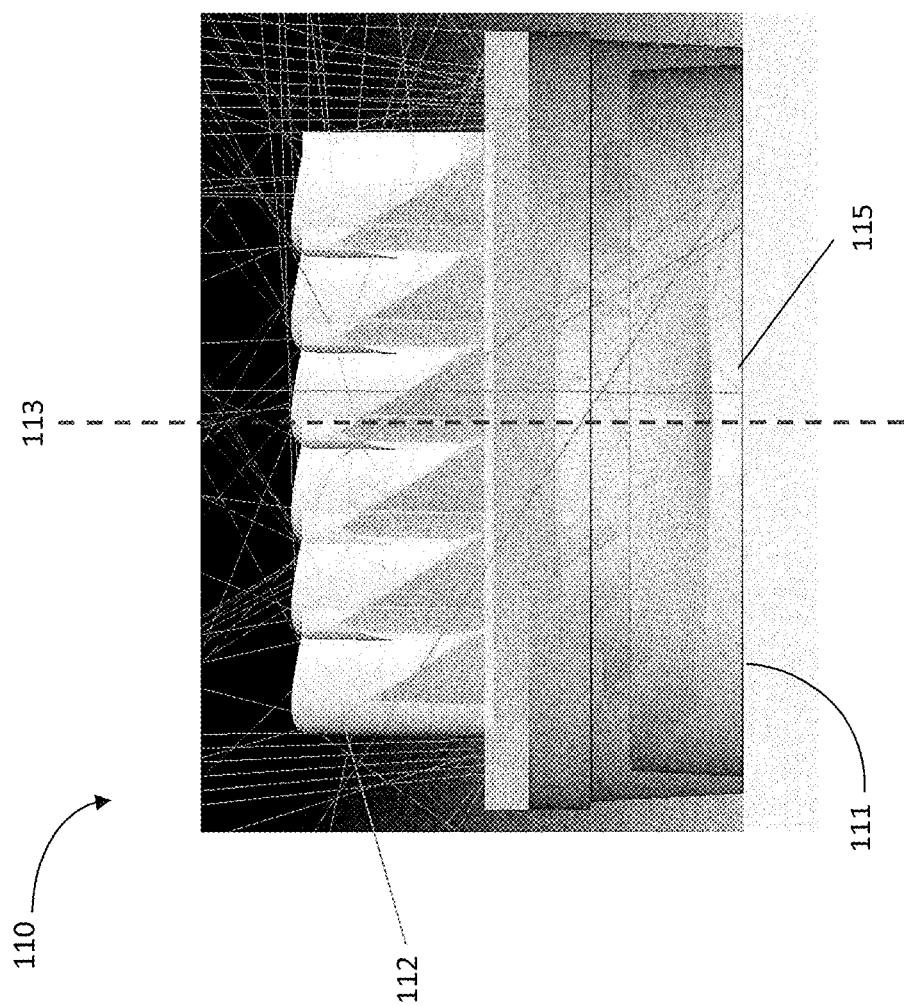
FIG. 13 is a ray diagram of the optic assembly illustrated in FIG. 11.
Figure 14:
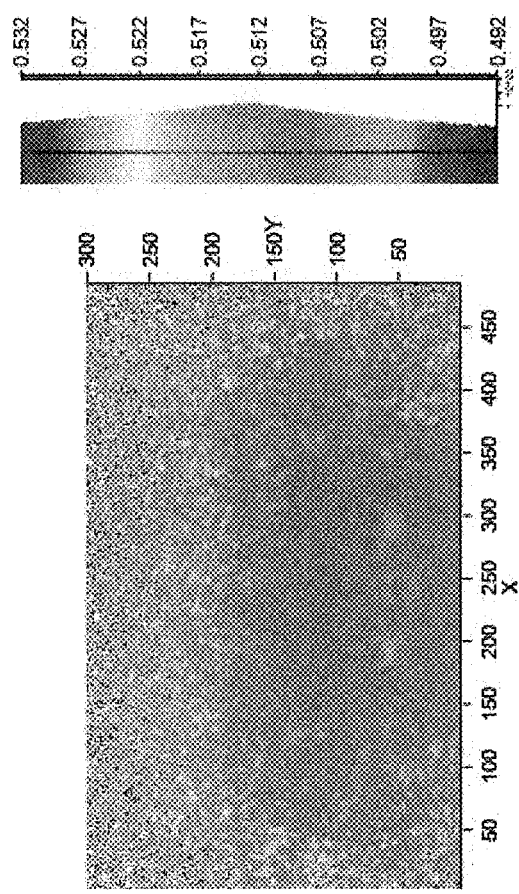
FIG. 14 illustrates color uniformity of the lighting distribution provided by the optic of FIGS. 11 and 13.

FIG. 11 is a ray diagram of an optic assembly comprising a collimation optic in conjunction with light redirection elements according to some embodiments. As illustrated in FIG. 11, the collimation optic 111 of the assembly 110 comprises Fresnel architecture. The collimation optic 111 collimates light received from a light source 115, such as one or more LEDs, and passes the collimated light along an axis 113 to the light redirection elements 112. Facets 114 of the light redirection elements 112 redirect the light in directions away from the collimation axis 113. FIG. 12 illustrates the lighting distribution provided the optic assembly of FIG. 11. As illustrated in FIG. 12, collimated light is redirected at angles greater than 50 degrees. FIG. 13 is another ray diagram of the collimating optic 111 and light redirection elements 112 illustrated in FIG. 11. Collimating light from a light source 115, such as a plurality of LEDs, prior to redistribution by the light redirection elements can improve color mixing and light uniformity. In such embodiments, hot spots or bright spots can be mitigated, leading to lighting solutions with less discomfort and glare. FIG. 14 illustrates color uniformity of the lighting distribution provided by the optic assembly 110 of FIGS. 11 and 13.

Figure 15B:
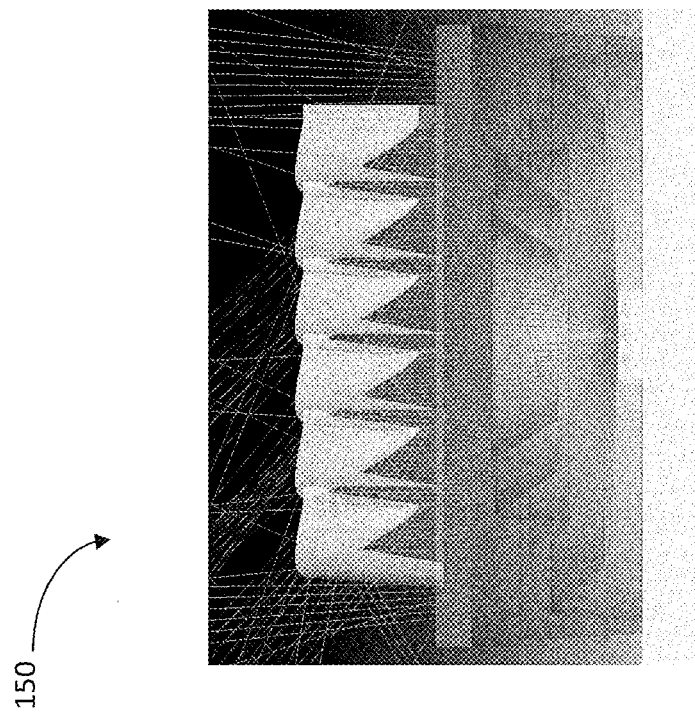
FIGS. 15(a) and 15(b) are ray diagrams of an optic assembly according to some embodiments.
Figure 15A:
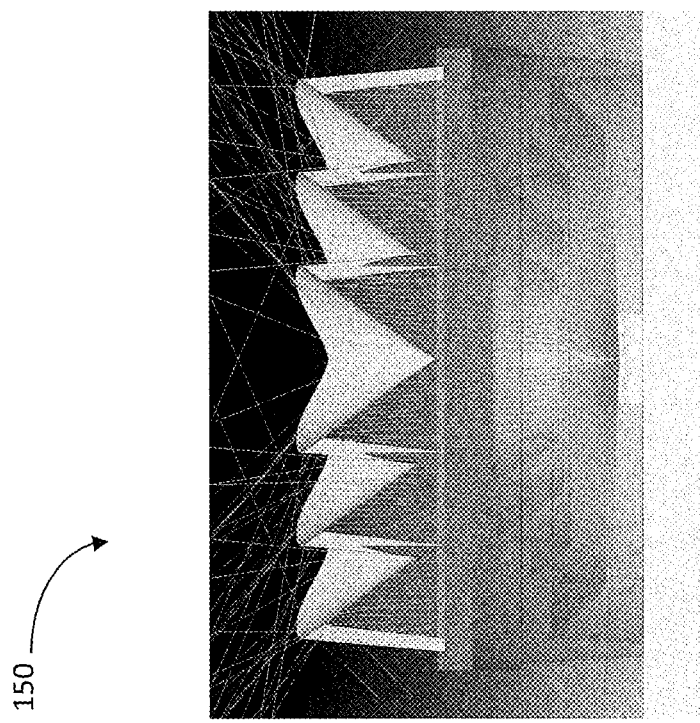
Figures 16, 17:
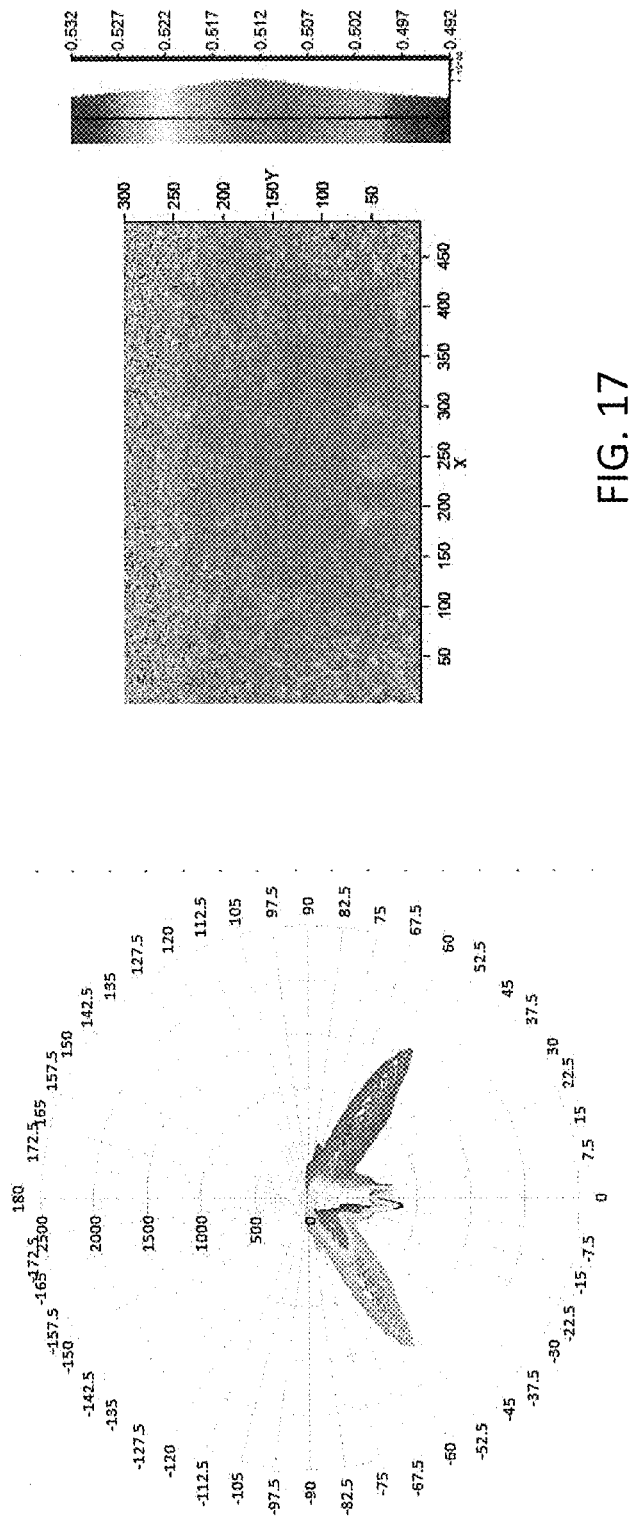
FIG. 16 illustrates lighting distribution of the optic assembly of FIGS. 15(a) and 15(b).
FIG. 17 illustrates color uniformity of the lighting distribution provided by the optic assembly of FIGS. 15(a) and 15(b).
Figure 18A:
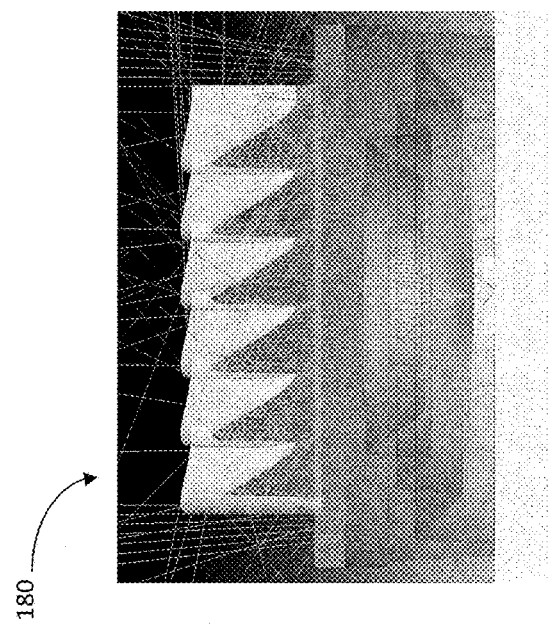
FIGS. 18(a) and 18(b) are ray diagrams of an optic assembly according to some embodiments.
Figure 18B:
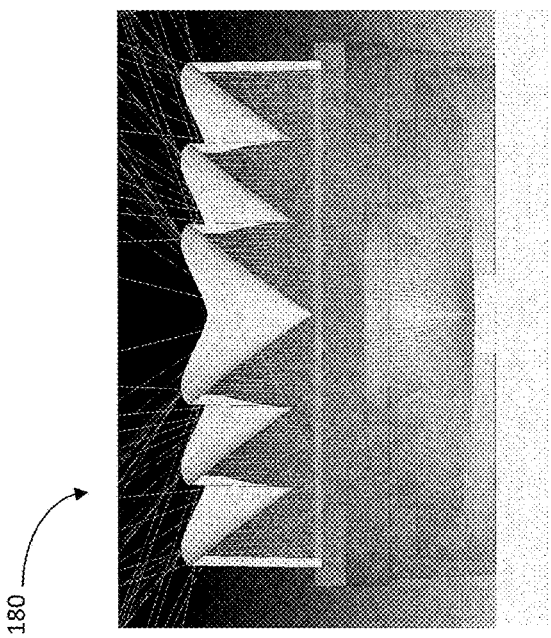
Figures 19, 20:
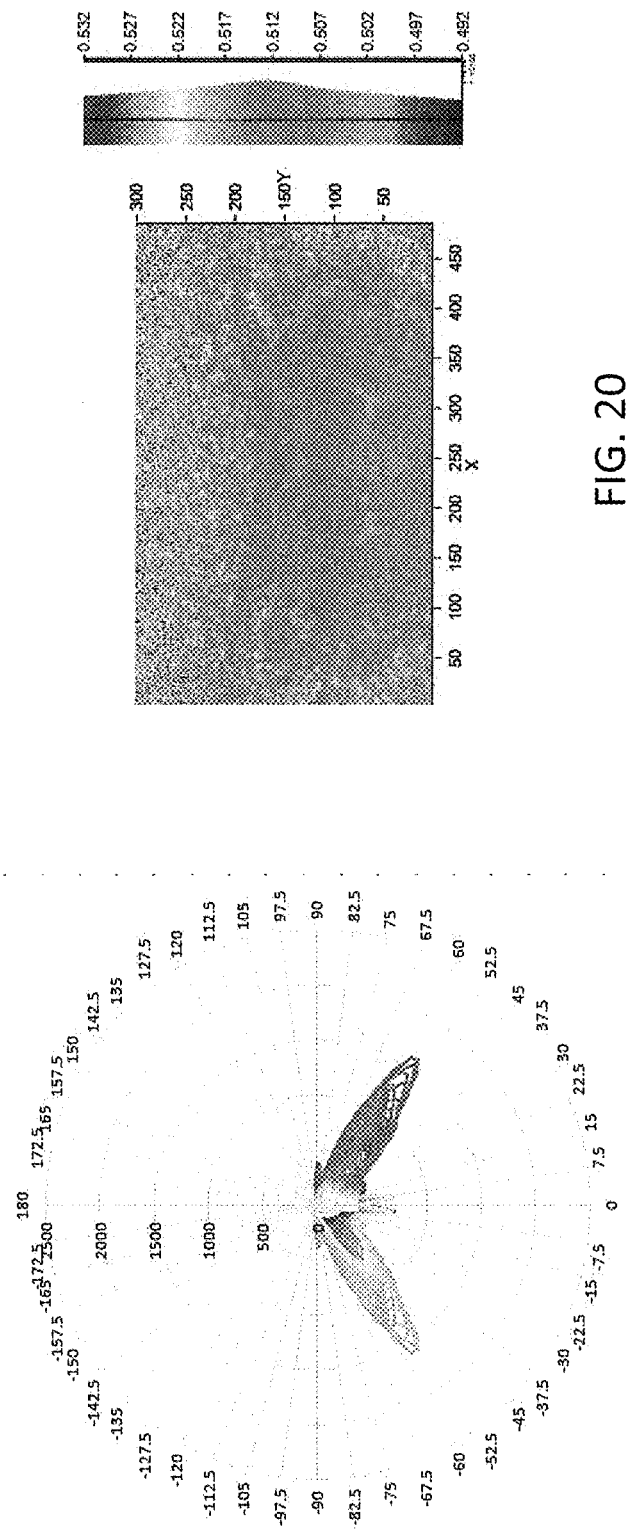
FIG. 19 illustrates lighting distribution of the optic assembly of FIGS. 18(a) and 18(b).
FIG. 20 illustrates color uniformity of the lighting distribution provided by the optic assembly of FIGS. 18(a) and 18(b).

FIGS. 15(a) and 15(b) are ray diagrams of another optic assembly comprising a collimation optic and associated light redirection elements. The optic assembly 150 also provides a high angle distribution of light exceeding 50 degrees, as provided in FIG. 16. Color uniformity of the lighting distribution is provided in FIG. 17. FIGS. 18(a) and 18(b) are ray diagrams of another optic assembly comprising a collimation optic and associated light redirection elements. The optic assembly 180 provides a high angle distribution of light exceeding 50 degrees with good color uniformity as illustrated in FIGS. 19 and 20 respectively.

Figure 21:
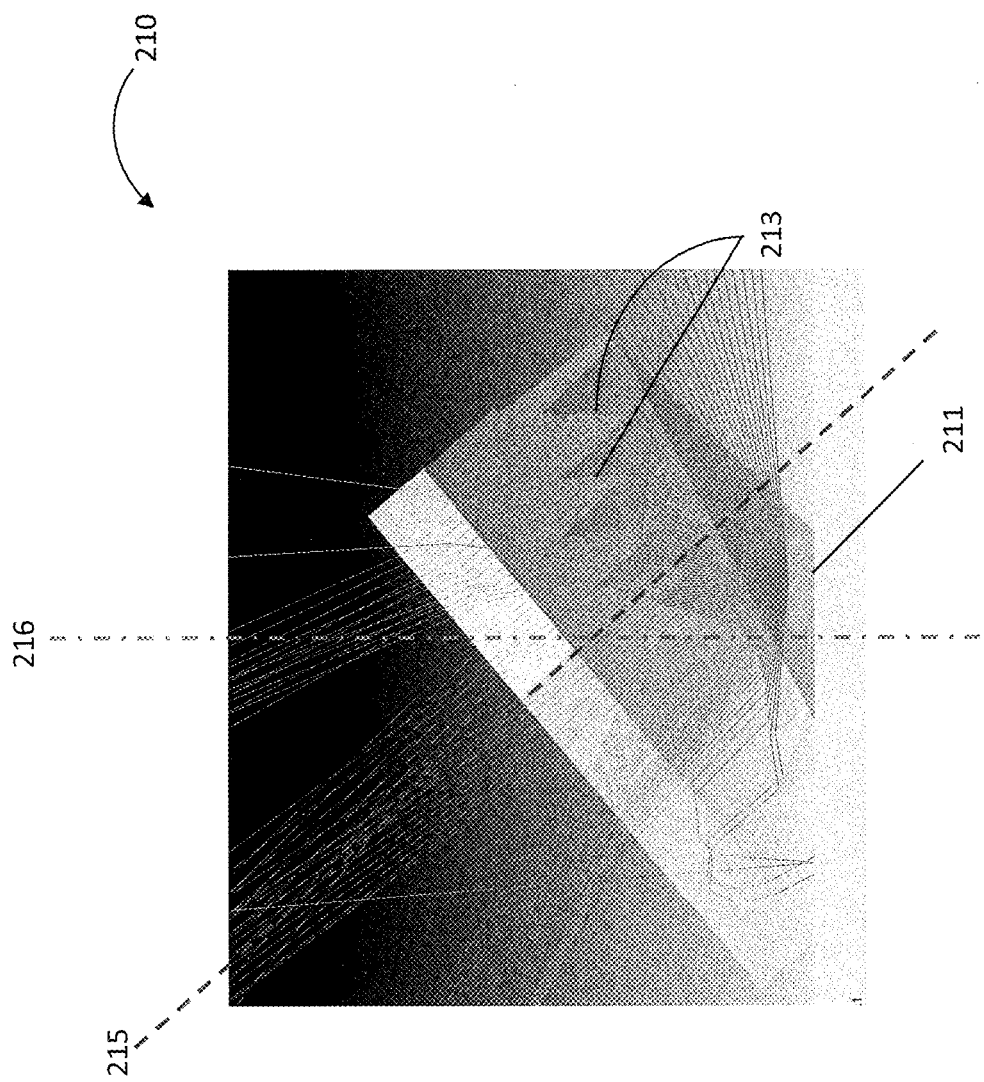
FIG. 21 illustrates a Fresnel optic tilted relative to a vertical axis according to some embodiments.

In another aspect, a collimating optic having a Fresnel architecture described herein can be angled relative to the light source to provide collimation along an axis intersecting with the optic vertical axis. Facets of the Fresnel optic, for example, can be arranged relative to the vertical axis at angle(s) supporting total internal reflection along facet surfaces. Total internal reflection of light received by the facets can redirect the light along a collimation axis intersecting the vertical axis of the optic. FIG. 21 is a ray diagram of a Fresnel optic angled relative to the light source according to some embodiments. As illustrated in FIG. 21, the Fresnel optic 210 is angled relative to the light source 211 such that facets 213 of the optic redirect the light via total internal reflection. A portion of the light is steered along a collimation axis 215 intersecting the vertical axis 216 at the desired angle. The Fresnel optic 210 can also refract light in one or more directions to provide the desired lighting distribution, such as a high angle distribution. In some embodiments, the Fresnel optic can comprise one or more surfaces having a reflective coating for redirecting light into the desired distribution. Reflective coatings can be employed in any combination with total internal reflection surfaces and/or refractive surfaces to provide the desired lighting distribution.

Figure 22:
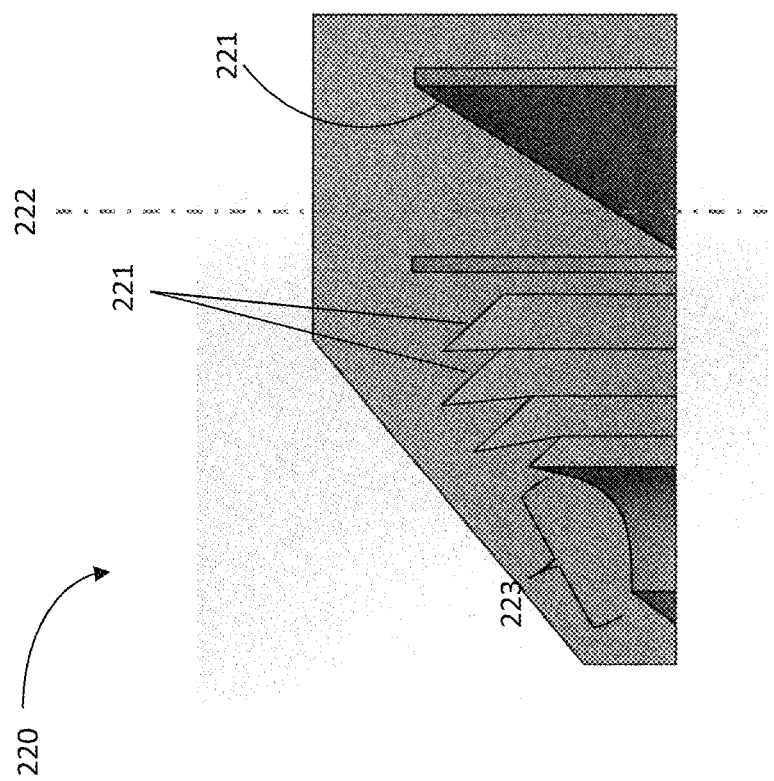
FIG. 22 illustrates a light redirection optic according to some embodiments.
Figure 23:
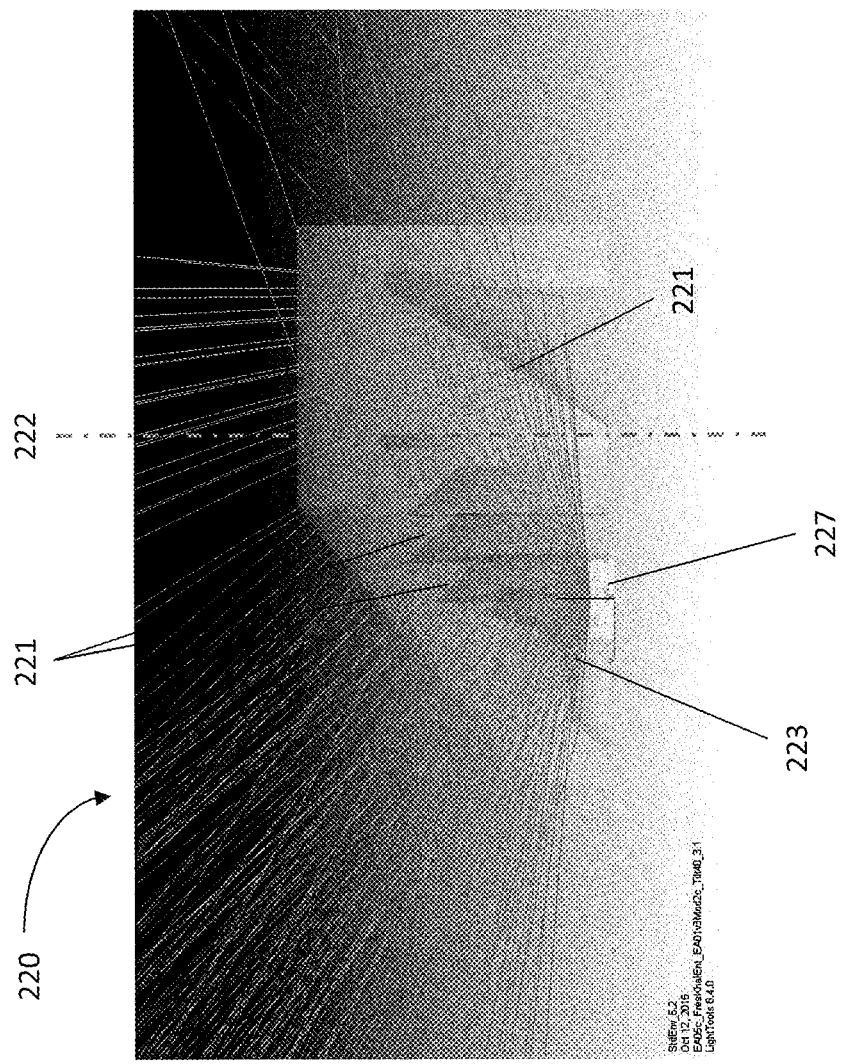
FIG. 23 is a ray diagram illustrating light redirection by total internal reflection facets and refractive surfaces of the optic illustrated in FIG. 22.
Figure 24:
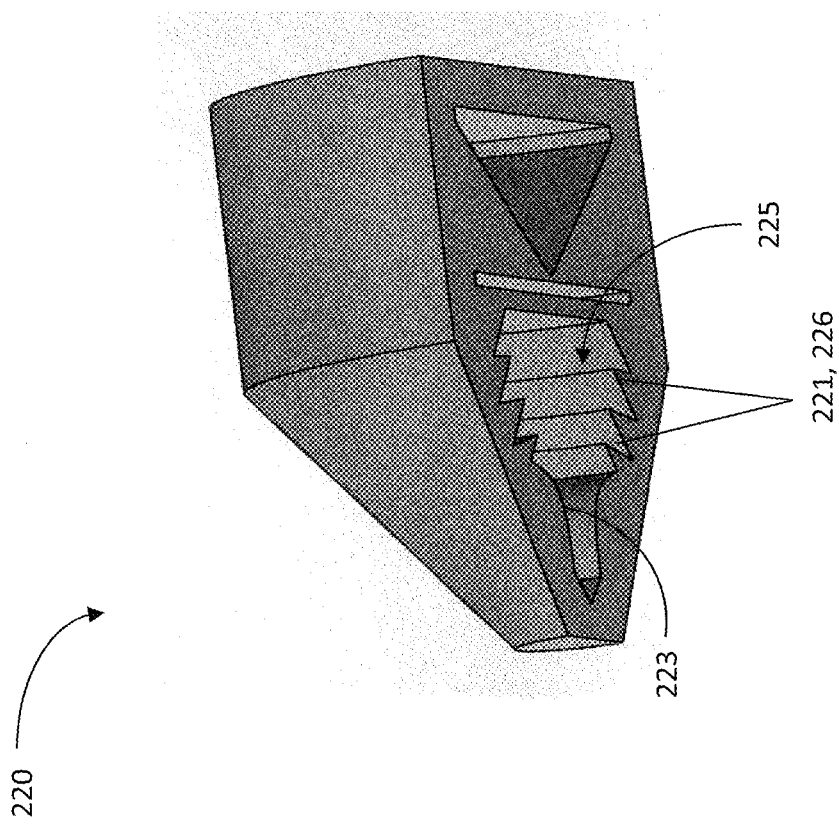
FIG. 24 is a perspective view of the optic having the cross-section illustrated in FIG. 22.

In another aspect, optics are described herein which do not collimate light for redirection into the desired lighting distribution. In some embodiments, a light redirection optic comprises facets supporting total internal reflection in conjunction with refractive optics to provide desired lighting distributions. FIG. 22 illustrates a cross-sectional view of a light redirection optic comprising total internal reflection facets and refractive elements according to some embodiments. As provided in FIG. 22, the redirection optic 220 comprises facets 221 having orientation relative to the vertical axis 222 of the optic 220 at angle(s) supporting total internal reflection. Specific angles supporting total internal reflection are dependent upon the refractive index of the material forming the redirection optic. The redirection optic also includes refractive elements or surfaces in addition to the facets supporting total internal reflection. The refractive elements 223 can have any structure or geometry to provide the desired lighting distribution. In the embodiment of FIG. 22, the optic 220 comprises refractive surfaces 223 adjacent to the facets 221. FIG. 23 is a ray diagram illustrating total internal reflection by the facets 221 to direct light away from a vertical axis 222 of the redirection optic 220. Refractive surfaces 223 also direct light away from the vertical axis 222. In some embodiments, high angle lighting distributions, such as those illustrated in FIGS. 12, 16 and 19, are provided by the redirection optic. FIG. 24 is a perspective view of the optic having the cross-section illustrated in FIG. 22. The facets 221 can be annular segments 226 defining a cavity 225 of the optic 220. The cavity can be aligned with or surround a light source 227 as illustrated in FIG. 23.

Figure 25:
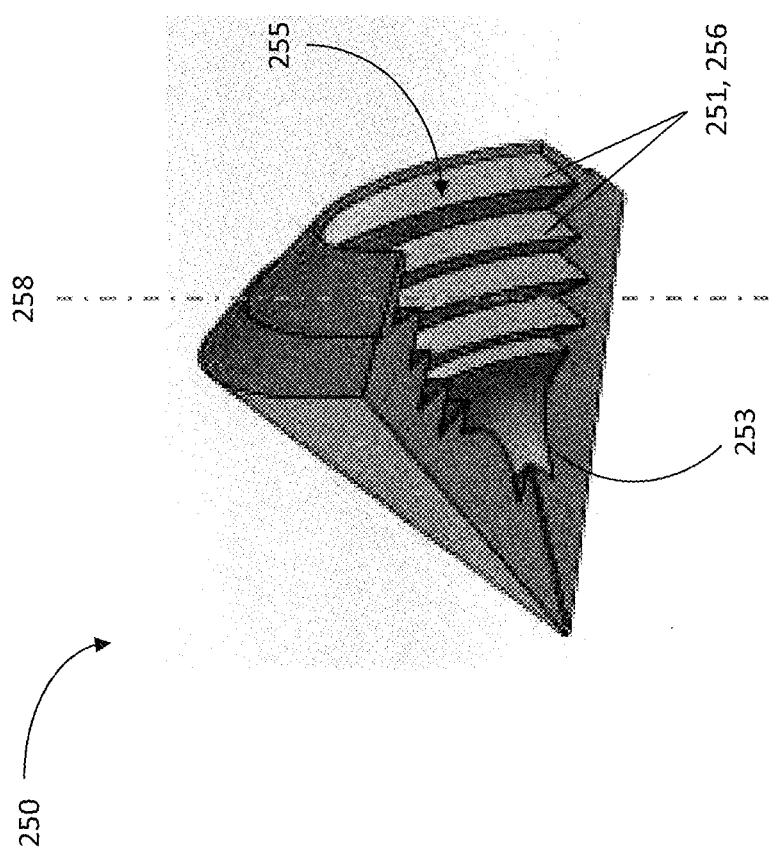
FIG. 25 is a perspective view of redirection optic employing total internal reflection facets in the form of annular segments according to some embodiments.
Figure 26:
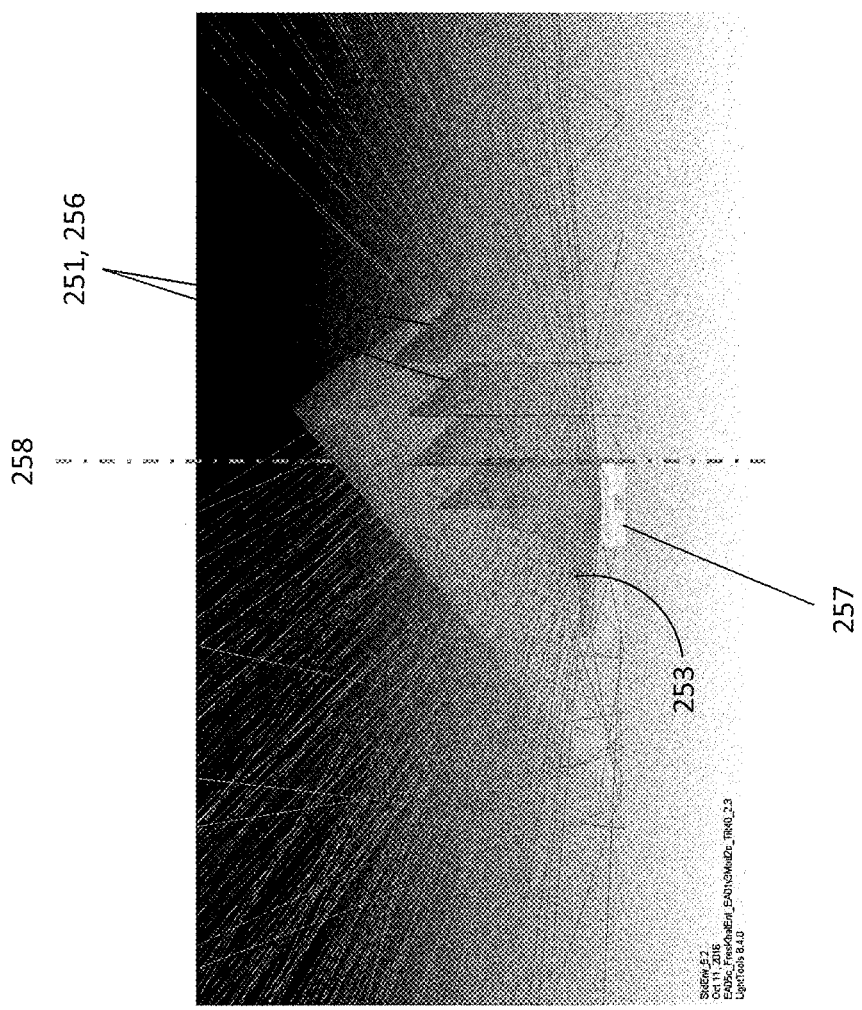
FIG. 26 is a ray diagram of the optic of FIG. 25 illustrating redirection of light away from the vertical axis of the optic by total internal reflection facets and refractive surfaces according to some embodiments.

FIG. 25 is a perspective view of another redirection optic 250 employing total internal reflection facets 251 in the form of annular segments 256. The annular segments 256 also form a cavity 255 for covering or receiving a light source 257 as illustrated in FIG. 26. The redirection optic 250 also comprises refractive surfaces 253 for directing light away from the vertical axis 258 of the redirection element 250 in conjunction with the total internal reflection facets 251. FIG. 26 is a ray diagram of the optic of FIG. 25 illustrating redirection of light away from the vertical axis 258 of the optic 250 by total internal reflection facets 251 and refractive surfaces 253.

II. Luminaires

In another aspect, luminaire architectures are described herein. In some embodiments, a luminaire comprises a light source and one or more optic assemblies receiving light from the light source, the optic assemblies comprising a collimating optic directing the light along a collimation axis and light redirection elements. The light redirection elements comprise facets for redirecting a portion of the light in one or more directions away from the collimation axis. As described further herein, the optic assembly, in some embodiments, can assist in providing high angle or lateral lighting distributions from the luminaire.

Luminaires described herein, can comprise individual modules including one or more light sources. In some embodiments, for example, a luminaire comprises individual modules comprising one or more LEDs. FIGS. 27(a) and 27(b) illustrate LED panels comprising array of LED modules 60, 61 coupled to the base 52 of a heatsink 51 of a luminaire according to some embodiments. In the embodiment illustrated in FIGS. 27(a) and 27(b), two LED panels are arranged around the central aperture 53 of the heatsink base 52. LED panels can be fabricated to match any shape of the heatsink base. For example, in some embodiments, the heatsink base can be circular or elliptical, wherein the LED panels are provided arcuate shapes for coupling to the base. Pins 62 can be used to secure the LED panels and associated modules 60, 61 in place for rough alignment followed by electrical connection of the panels to wires 59' of the wire harness 57. Thermal paste or glue can be used to improve the adhesion and/or thermal coupling to the heatsink 51. Optic assemblies having any construction and/or properties described in Section I herein can be positioned over each of the LED modules 60, 61a to provide the desired lighting distribution from the luminaire In some embodiments, optic assemblies of the same design and/or construction are provided over the LED modules 60, 61. Alternatively, optic assemblies described herein of differing construction can be applied over the LED modules 60, 61. For example, specific design of the optic assemblies can vary according to position of the LED module in the array. In the embodiment of FIGS. 27(a)-(b), optic assemblies of LED modules 60, 61 at the perimeter of the panels may differ from optic assemblies of LED modules 60, 61 residing at interior positions of the panels.

In some embodiments, optic assemblies are provided in an individual or independent format for positioning over LED modules. For example, a single optic assembly can be independently positioned over a single LED module. Depending on desired lighting distribution from the luminaire, single optic assemblies can be provided for each of the LED modules in an array or any subset of LED modules in an array. Referring once again to FIGS. 27(a)-(b), individual optic assemblies can be independently arranged over all the LED modules, 60, 61 or a subset of the LED modules 60, 61. When arranged over a subset of LED modules, the optic assemblies described herein can work in conjunction with optical element and/or assemblies of differing design and architecture to provide desired lighting distributions from the luminaire. Alternatively, optic assemblies described herein can be part of a single or monolithic optic covering modules of an LED array. A monolithic optic can employ an array of optic assemblies having placement corresponding to LED modules of an array. In some embodiments, each of the optic assemblies of the monolithic optic can have construction and/or properties described in Section I herein. In other embodiments, a monolithic optic can comprise an array of optic assemblies having construction and/or properties described in Section I herein in combination with optics of differing construction to provide desired lighting distributions from the luminaire. In some embodiments, a single monolithic optic can cover the entire LED array or portion(s) of the LED array. In other embodiments, multiple monolithic optics can be employed to cover the entire LED array. Monolithic optics covering an LED array can have the same construction or differing constructions depending on desired lighting distribution from the luminaire For example, monolithic optic(s) comprising an array, of optic assemblies described herein can be combined with monolithic optic(s) comprising optic assemblies or elements of differing construction. In further embodiments, a monolithic optic can be combined with individual or single optic assemblies or elements to cover LED modules of an array. A monolithic optic comprising an array of optic assemblies described herein can cover one or more portions of an LED array wherein remaining LED modules are covered by individual optics or elements. In other embodiments, individual optic assemblies described herein cover a portion of LED modules in an array with the remainder of the modules being covered by a monolithic optic comprising optical elements of differing construction and properties.

Figure 27C:
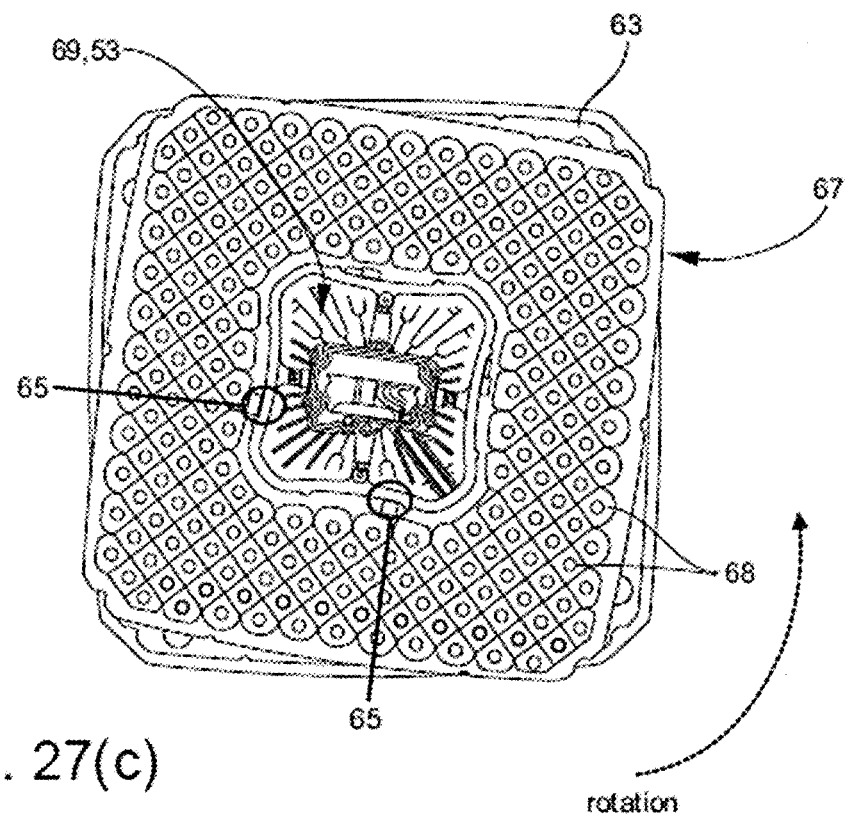
FIGS. 27(c) and 27(d) illustrate a monolithic optic comprising an array of optic assemblies according to some embodiments.
Figure 27D:
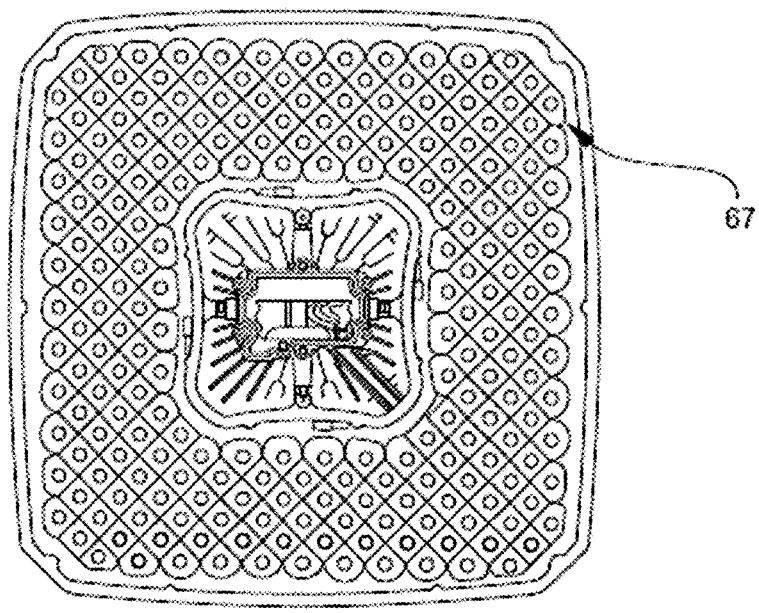

FIG. 27(c) illustrates a monolithic optic comprising an array of optic assemblies according to some embodiments. Optic assemblies 68 of the array can have any construction described herein. In some embodiments, the optic assemblies 68 have the same construction and properties. In other embodiments, construction and properties of the optic assemblies 68 can vary across the array according to desired lighting distributions from the luminaire. As described above, all the optic assemblies 68 of the array can have construction and properties of Section I. In other embodiments, any subset of the optic assemblies 68 can have construction and properties of Section I. The optic 67 also includes a central aperture 69 commensurate with the central aperture 53 of the LED heatsink. The underlying LED array 63 can have guide features 65 permitting proper alignment of the optic 67. The guide features 65 can have any desired location on the LED array 63. In the embodiment of FIG. 27(d), the guide features 65 are located along the rim of the LED array 63 bordering the central aperture 53. The optic 67 is rotated to engage the guide features and placed in proper alignment as illustrated in FIG. 27(d). In some embodiments, the guide features 65 can have design to lock the optic 67 in place.

The luminaire of FIGS. 27(a)-(b) and FIGS. 27(c)-(d) can be a high bay light fixture or low bay light fixture in some embodiments. The luminaire of FIGS. 27(a)-(d) can be a fixture described in U.S. patent application Ser. No. 15/181,065, filed on Jun. 13, 2016 and/or U.S. patent application Ser. No. 15/018,606 , each of which is incorporated herein by reference in its entirety.

Figure 28:
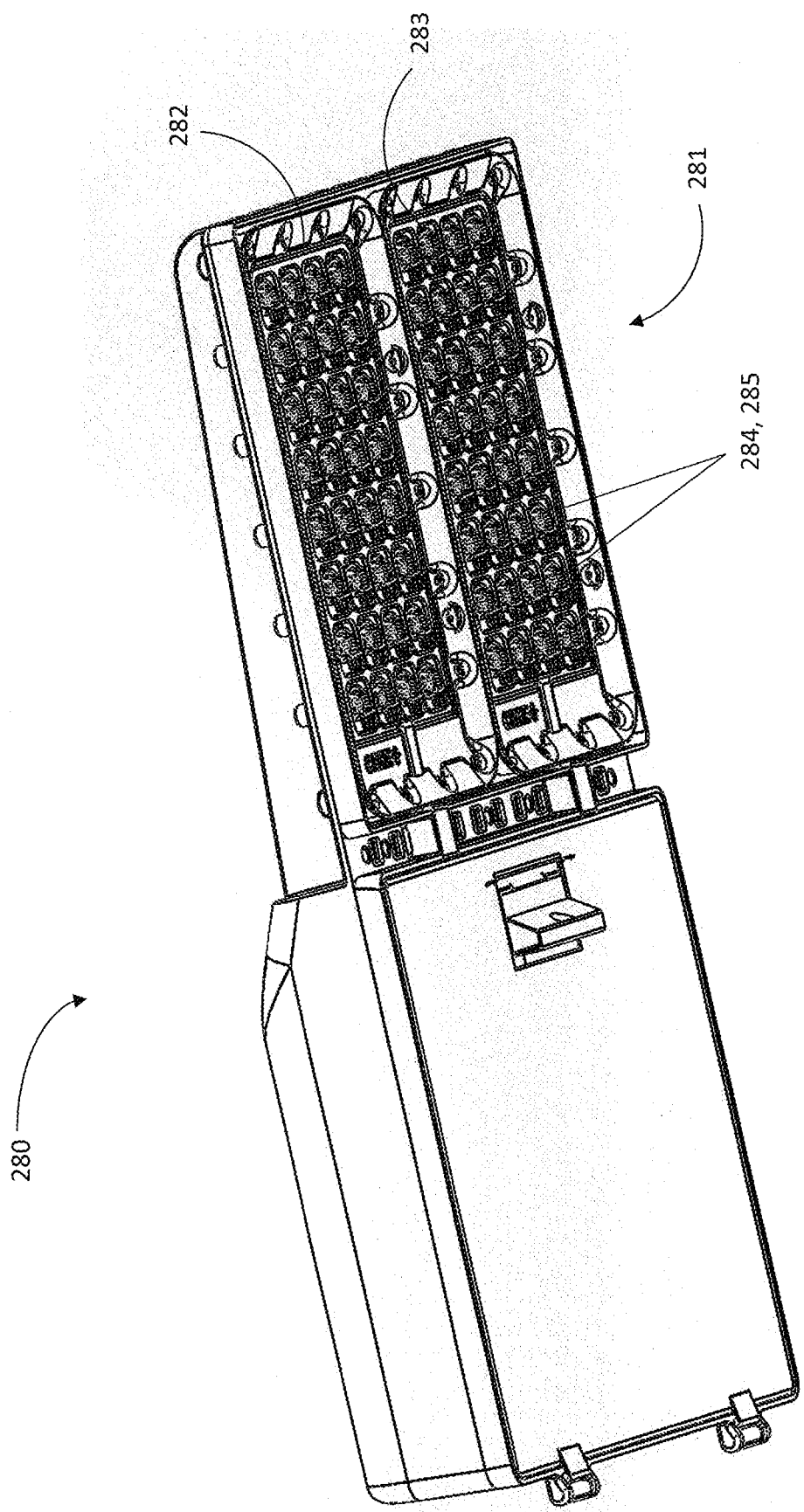
FIG. 28 is a perspective view of a roadway luminaire according to some embodiments.

In some embodiments, roadway luminaires or fixtures comprise LED modules in which optic assemblies can be incorporated. FIG. 28 is a perspective view of a roadway luminaire according to some embodiments. The light emitting face 281 of the roadway luminaire 280 comprises two arrays 282, 283 of LED modules 284. Optic assemblies 285 having any construction and/or properties described in Section I herein can be positioned over each of the LED modules 284 to provide the desired lighting distribution from the luminaire. In some embodiments, optic assemblies 285 of the same design and/or construction are provided over the LED modules 284. Alternatively, optic assemblies 285 described herein of differing construction can be applied over the LED modules 284. For example, specific design of the optic assemblies 285 can vary according to position of the LED module 284 in the array 282, 283. Additionally, the optic assemblies can be provided in individual format or part of an array in a monolithic optic construction described above.

Optic assemblies described herein can assist in providing Type II, Type III or Type V lighting distributions from luminaires. Accordingly, luminaires comprising the optic assemblies can be used in a variety of outdoor lighting applications including, but not limited to, sidewalk lighting as well as roadway and parking lot lighting. Luminaires comprising optic assemblies described herein can also be employed in several indoor lighting applications. For example, luminaire can provide illumination to narrow spaces, such as aisles, hallways and/or corners of a building or house. Indoor applications also include wall washing. An asymmetric lighting distribution provided by a luminaire can illuminate surfaces of one or more walls. In some embodiments, for example, multiple walls illuminated by the luminaire intersect to form a corner. In other embodiments, multiple walls face one another such as in a hallway or corridor. In some embodiments, light fixtures are mounted on the ceiling or recessed into the ceiling for wall illumination. Alternatively, the light fixtures can be mounted on the floor or recessed into the floor for wall illumination according to methods described herein.

As described herein, high angle or lateral lighting distributions can be provided by luminaires comprising optic assemblies described herein. The lighting distributions can be asymmetric or symmetric in nature. In some embodiments, lighting distributions provided by luminaires comprising optic assemblies have peak intensity at angles greater than 30 degrees relative to nadir. Peak intensity of a lighting distribution provided by light fixtures described herein can also have one or more values selected from Table II.

TABLE II

| Peak Intensity of Lateral Lighting Distribution Relative to Nadir |
| --- |
| ≥40 |
| ≥50 |

TABLE II-continued

| Peak Intensity of Lateral Lighting Distribution Relative to Nadir |
| --- |
| ≥60 |
| ≥70 |
| ≥80 |
| 30-85 |
| 40-85 |
| 50-70 |
| 50-85 |
| 60-85 |

Luminaires can also comprise light redirection optics in addition to or in place of optic assemblies. Luminaires, for example, can comprise light redirection optics comprising total internal reflection facets of Fresnel architecture as well as refractive surfaces, including those illustrated in FIGS. 22-25. Light redirection optics can be coupled to LED modules in a manner similar to that for optic assemblies described herein. Light redirection optics can also have any design to provide lighting distributions similar to or the same as optic assemblies described herein.

LED light sources may comprise packaged LED chip(s) or unpackaged LED chip(s). LED elements or modules can use LEDs of the same or different types and/or configurations. The LEDs, for example, can be monochromatic or any desired color combination. The LEDs can comprise single or multiple phosphor-converted white and/or color LEDs, and/or bare LED chip(s) mounted separately or together on a single substrate or package that comprises, for example, at least one phosphor-coated LED chip either alone or in combination with at least one color LED chip, such as a green LED, a yellow LED, a red LED, etc. The LED module can comprise phosphor-converted white or color LED chips and/or bare LED chips of the same or different colors mounted directly on a printed circuit board (e.g., chip on board) and/or packaged phosphor-converted white or color LEDs mounted on the printed circuit board, such as a metal core printed circuit board or FR4 board. In some embodiments, the LEDs can be mounted directly to a heat sink or another type of board or substrate. Depending on the embodiment, LED arrangements or lighting arrangements using remote phosphor technology can be employed as would be understood by one of ordinary skill in the art, and examples of remote phosphor technology are described in U.S. Pat. No. 7,614,759, assigned to the assignee of the present invention and hereby incorporated by reference.

In those cases where a soft white illumination with improved color rendering is to be produced, each LED element or module or a plurality of such elements or modules may include one or more blue shifted yellow LEDs and one or more red or red/orange LEDs as described in U.S. Pat. No. 7,213,940, assigned to the assignee of the present invention and hereby incorporated by reference. The LEDs may be disposed in different configurations and/or layouts along one or more edges of the waveguide body, as desired. Different color temperatures and appearances could be produced using other LED combinations of single and/or multiple LED chips packaged into discrete packages and/or directly mounted to a printed circuit board as a chip-on board arrangement. In one embodiment, the light sources can comprise any LED, for example, an XP-Q LED incorporating TrueWhite® LED technology or as disclosed in U.S. patent application Ser. No. 13/649,067, filed Oct. 10, 2012, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. In another embodiment, the light sources can comprise XQ-E LEDs developed by Cree, Inc.

Any of the embodiments disclosed herein incorporating LED light sources may include power or driver circuitry having a buck regulator, a boost regulator, a buck-boost regulator, a fly-back converter, a SEPIC power supply or the like and/or multiple stage power converter employing the like, and may comprise a driver circuit as disclosed in U.S. patent application Ser. No. 14/291,829, filed May 30, 2014, entitled "High Efficiency Driver Circuit with Fast Response" by Hu et al. or U.S. patent application Ser. No. 14/292,001, filed May 30, 2014, entitled "SEPIC Driver Circuit with Low Input Current Ripple" by Hu et al. incorporated by reference herein. The circuit may further be used with light control circuitry that controls color temperature of any of the embodiments disclosed herein, such as disclosed in U.S. patent application Ser. No. 14/292,286, filed May 30, 2014, entitled "Lighting Fixture Providing Variable CCT" by Pope et al. incorporated by reference herein.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. An optic assembly comprising:
a collimating optic directing light along a collimation axis; and
light redirection elements comprising facets for redirecting at least a portion of the collimated light in one or more directions away from the collimation axis,
wherein one or more of the facets intersect the collimation axis at an angle supporting redirection of the light by total internal reflection.

2. The optic assembly of claim 1, wherein the facets redirect the light from the collimation axis at one or more angles greater than 50 degrees.

3. The optic assembly of claim 1, wherein the light redirection elements are arranged into an array.

4. The optic assembly of claim 3, wherein the facets have variable spacing in the array.

5. The optic assembly of claim 3, wherein the facets have variable spacing in the array.

6. The optic assembly of claim 1, wherein the facets comprise radial curvature.

7. The optic assembly of claim 6, wherein facet height is constant over the radial curvature of a light redirection element.

8. The optic assembly of claim 6, wherein facet height varies over the radial curvature of a light redirection element.

9. The optic assembly of claim 8, wherein facet height is defined by one or more polynomial functions.

10. The optic assembly of claim 6, wherein radial curvature is uniform between the facets of the light redirection elements.

11. The optic assembly 6, wherein radial curvature varies between the facets of the light redirection elements.

12. The optical assembly of claim 3, wherein facet height varies over the array.

13. An optic assembly comprising:
a collimating optic directing light along a collimation axis, the collimating optic comprising collimation facets; and
light redirection elements comprising facets for redirecting at least a portion of the collimated light in one or more directions away from the collimation axis,
wherein spacing of the collimation facets matches spacing of the facets of the light redirection elements.

14. The optic assembly of claim 13, wherein the collimating optic is a Fresnel lens.

15. The optic assembly of claim 1, wherein the light redirection elements are coupled to the collimating optic.

16. The optic assembly of claim 1 having thickness of less than 4 mm.

17. A luminaire comprising:
a light source; and
one or more optic assemblies receiving light from the light source, the optic assemblies comprising
a collimating optic directing light along a collimation axis, and
light redirection elements comprising facets for redirecting at least a portion of the collimated light in one or more directions away from the collimation axis,
wherein one or more of the facets intersect the collimation axis at an angle supporting redirection of the light by total internal reflection.

18. The luminaire of claim 17, wherein the light redirection elements provide an asymmetric lighting distribution from the luminaire.

19. The luminaire of claim 17, wherein the light redirection elements provide a lateral lighting distribution from the luminaire having peak intensity at angles greater than 50 degrees relative to nadir.

20. The luminaire of claim 17, wherein the light redirection elements are arranged into an array.

21. The luminaire of claim 20, wherein the facets of the light redirection elements have variable spacing in the array.

22. The luminaire of claim 17, wherein the facets comprise radial curvature.

23. The luminaire of claim 22, wherein facet height is constant over the radial curvature of a light redirection element.

24. The luminaire of claim 22, wherein facet height varies over the radial curvature of a light redirection element.

25. The luminaire of claim 22, wherein radial curvature is uniform between the facets of the light redirection elements.

26. The luminaire of claim 22, wherein radial curvature varies between the facets of the light redirection elements.

27. The luminaire of claim 17, wherein the collimation axis is parallel to the luminaire vertical axis.

28. The luminaire of claim 17, wherein the collimation axis is offset from the luminaire vertical axis.

29. The luminaire of claim 17, wherein the light source comprises an array of light emitting diode (LED) modules and the optic assemblies are arranged over at least a portion of the LED modules.

30. The luminaire of claim 29, wherein the optic assemblies are independent of one another.

31. The luminaire of claim 29, wherein the optic assemblies are arranged into an array of a monolithic optic.

32. A luminaire comprising:
a light source; and
one or more optic assemblies receiving light from the light source, each optic assembly comprising:
a collimating optic directing light along a collimation axis, the collimating optic comprising collimation facets; and light redirection elements comprising facets for redirecting at least a portion of the collimated light in one or more directions away from the collimation axis,
wherein spacing of the collimation facets matches spacing of the facets of the light redirection elements.

* * * * *